Figure 1:
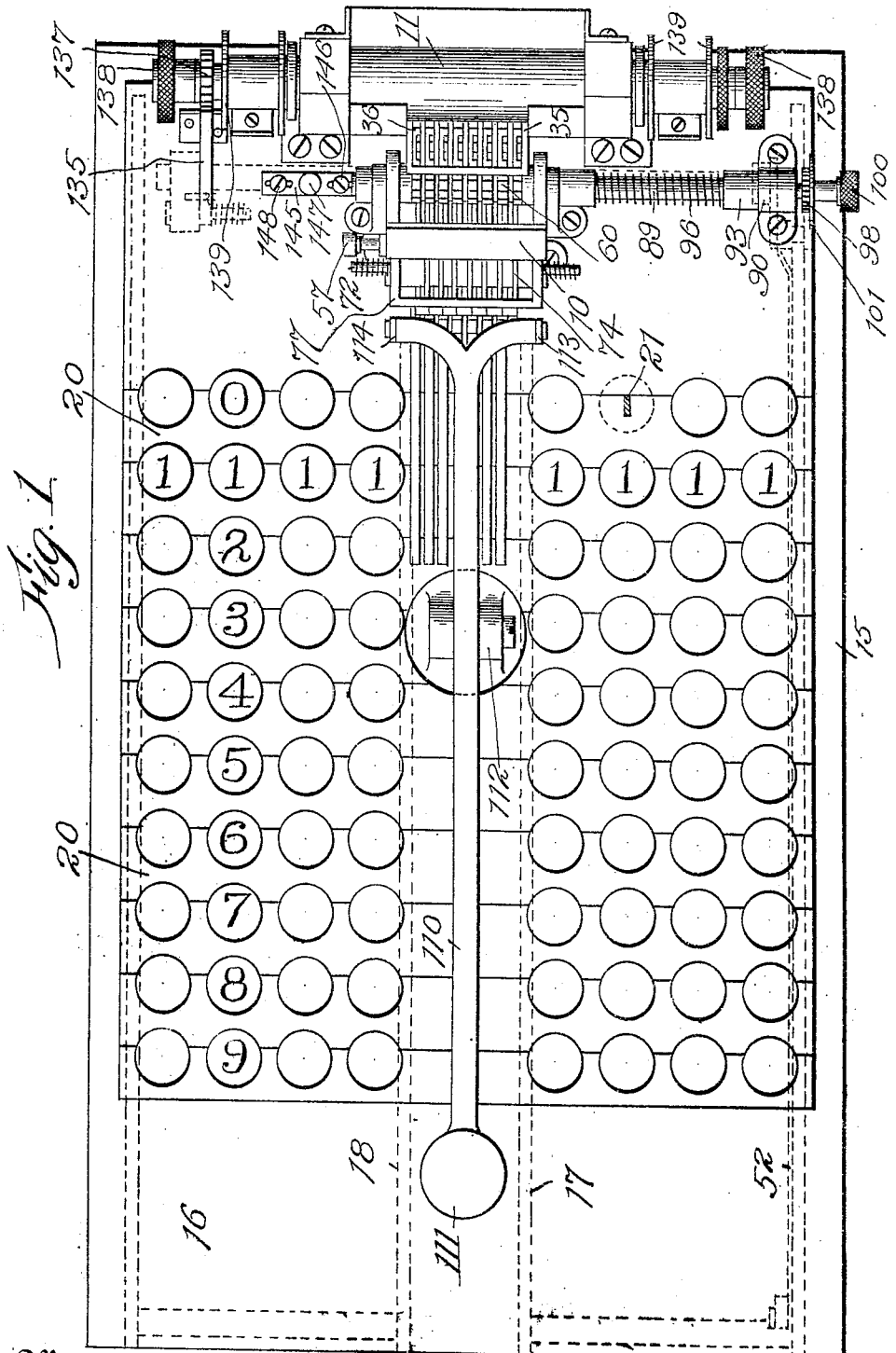

L. S. CRANDALL.
ADDING AND LISTING MACHINE.
APPLICATION FILED NOV. 11, 1908.

926,319.

Patented June 29, 1909.
13 SHEETS—SHEET 1.

Witnesses:
N. Alfred Jencke
H. H. Knight

Inventor
Lucien S. Crandall
By his Attorneys

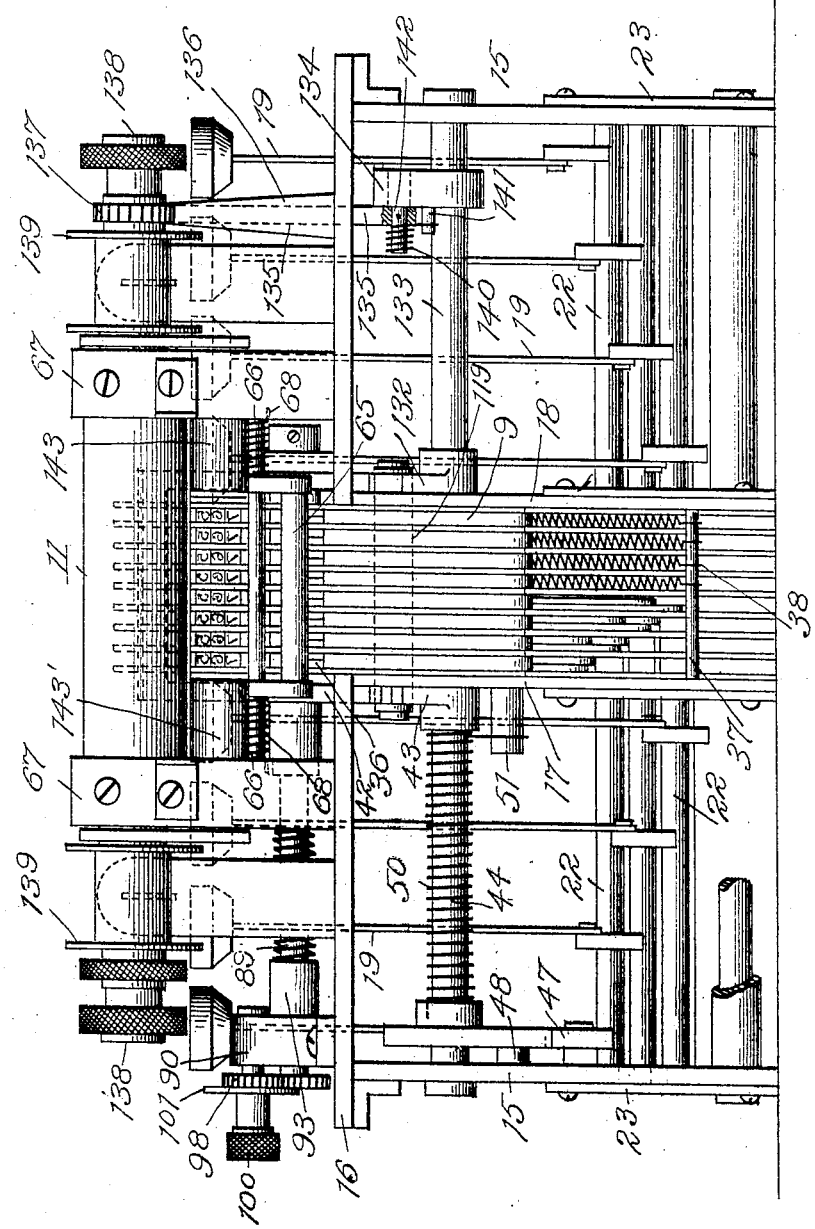

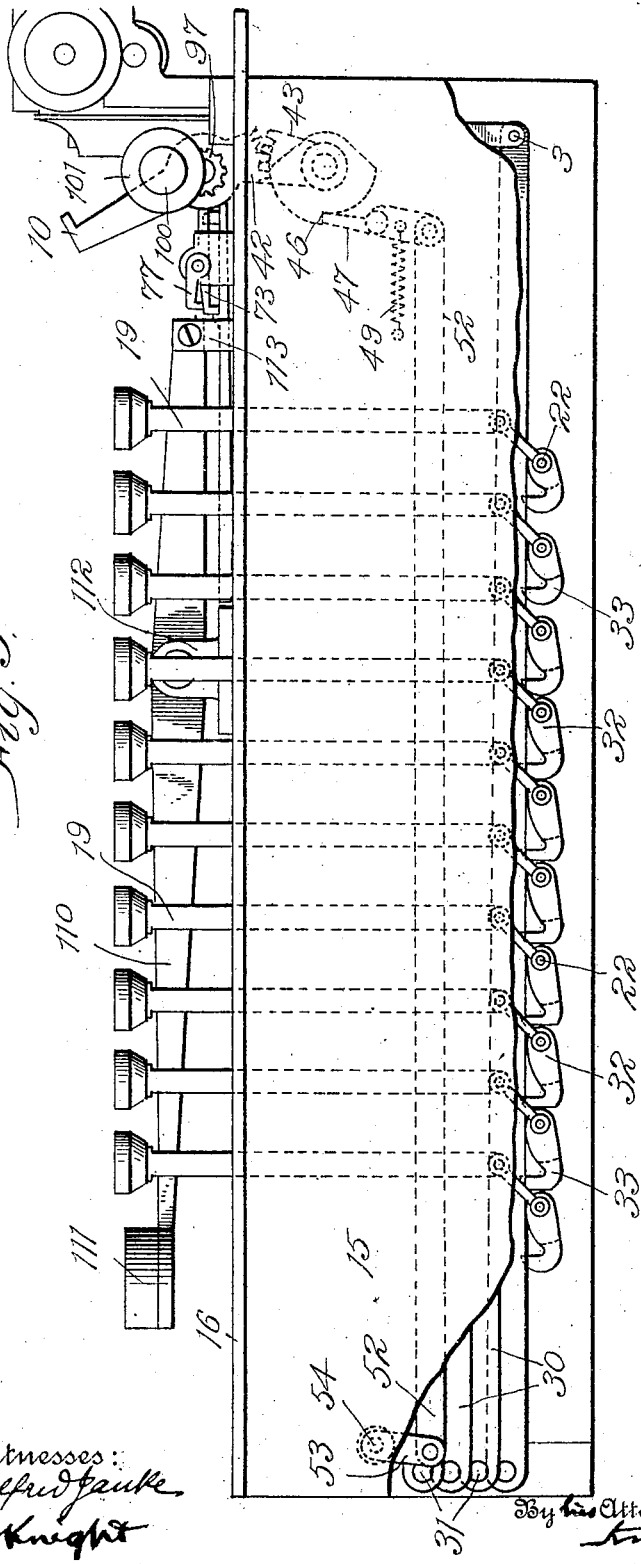

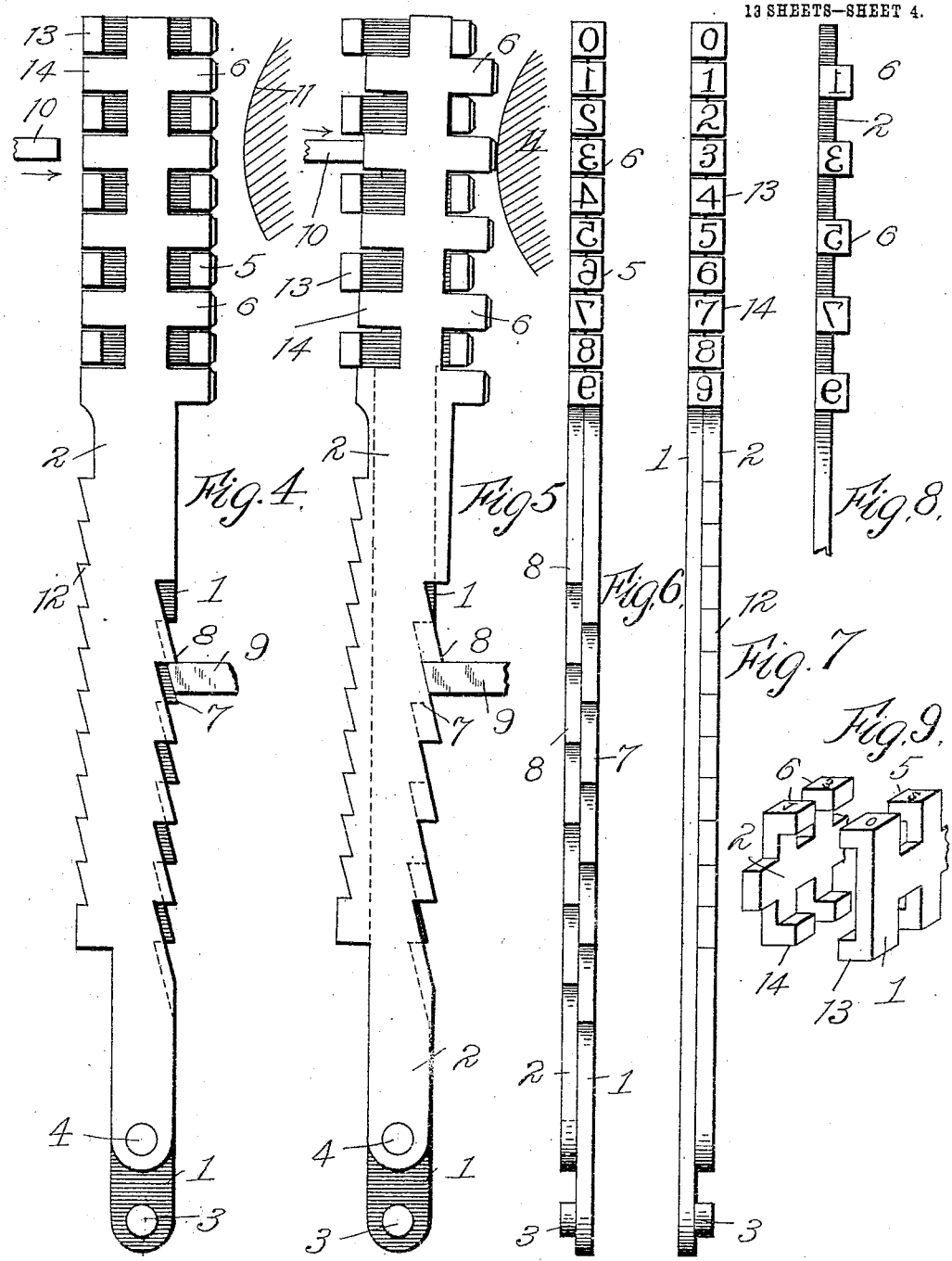

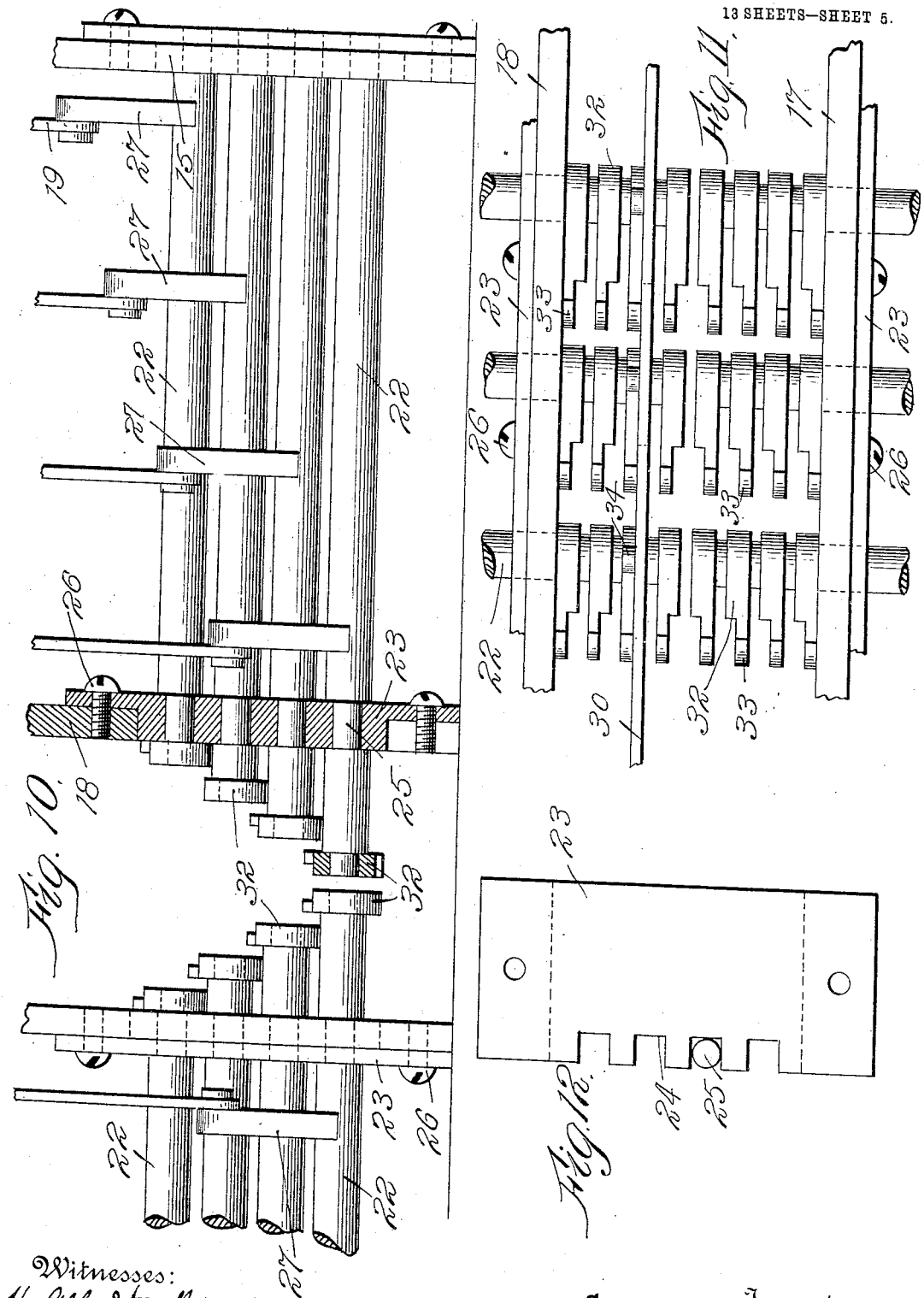

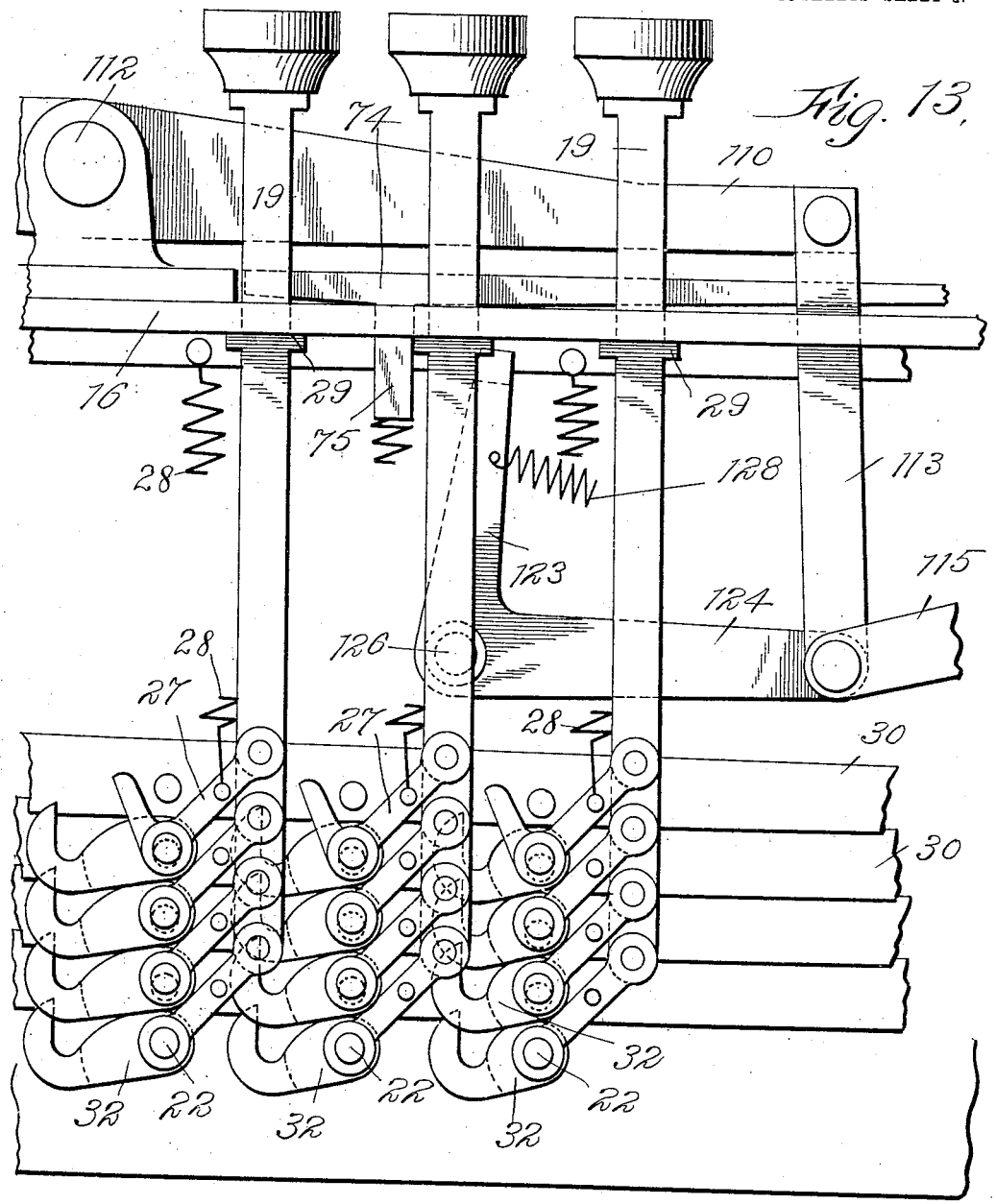

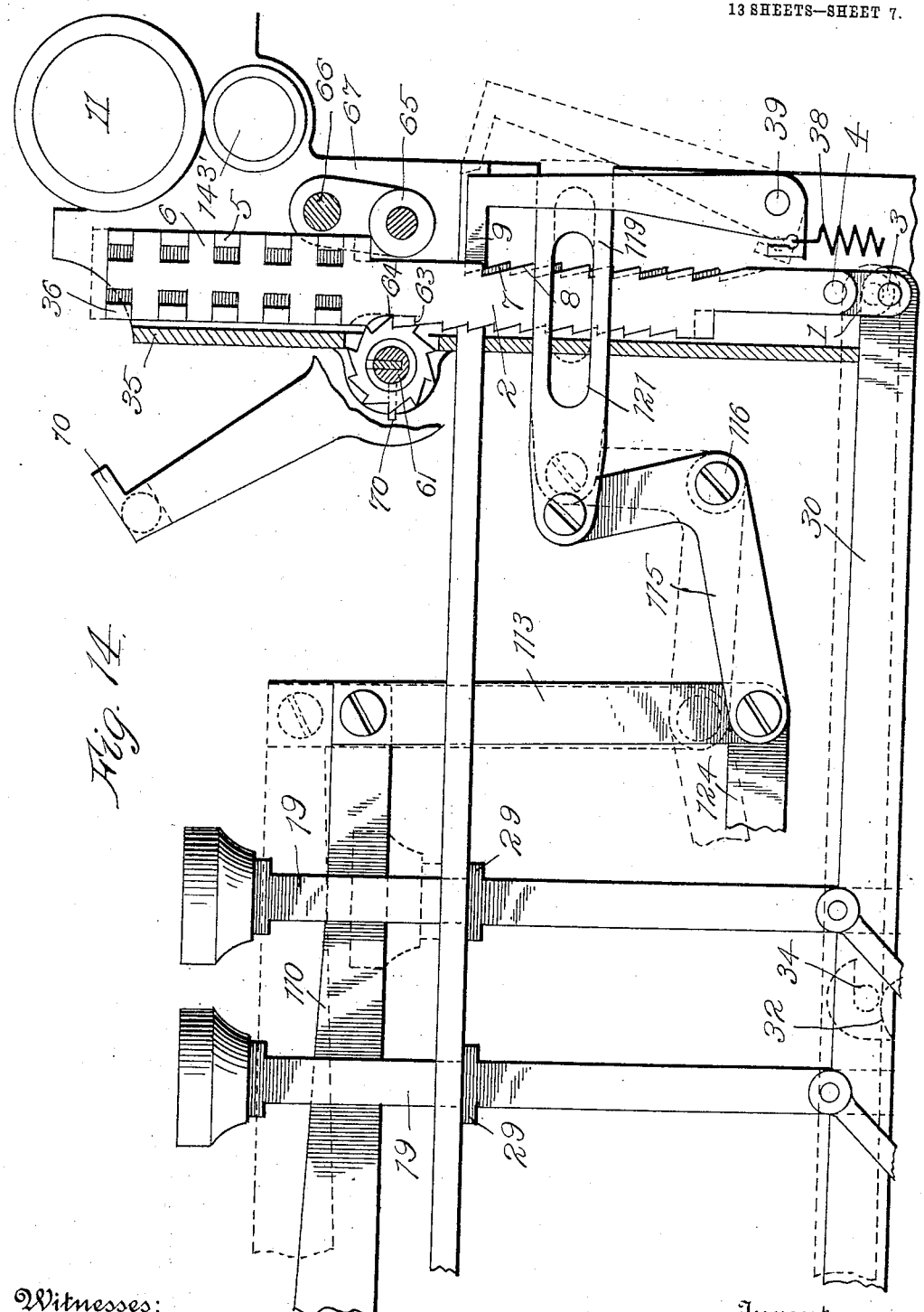

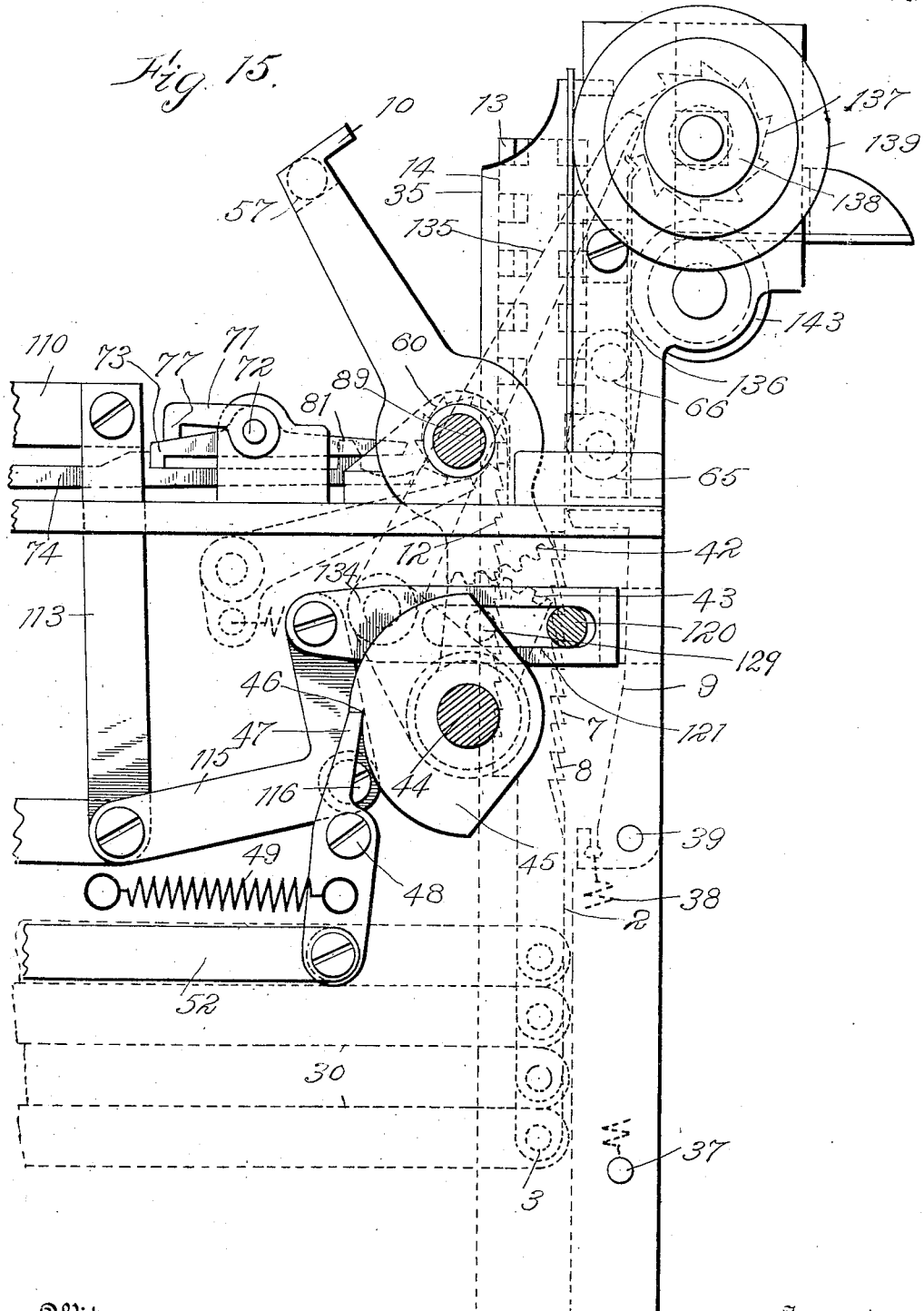

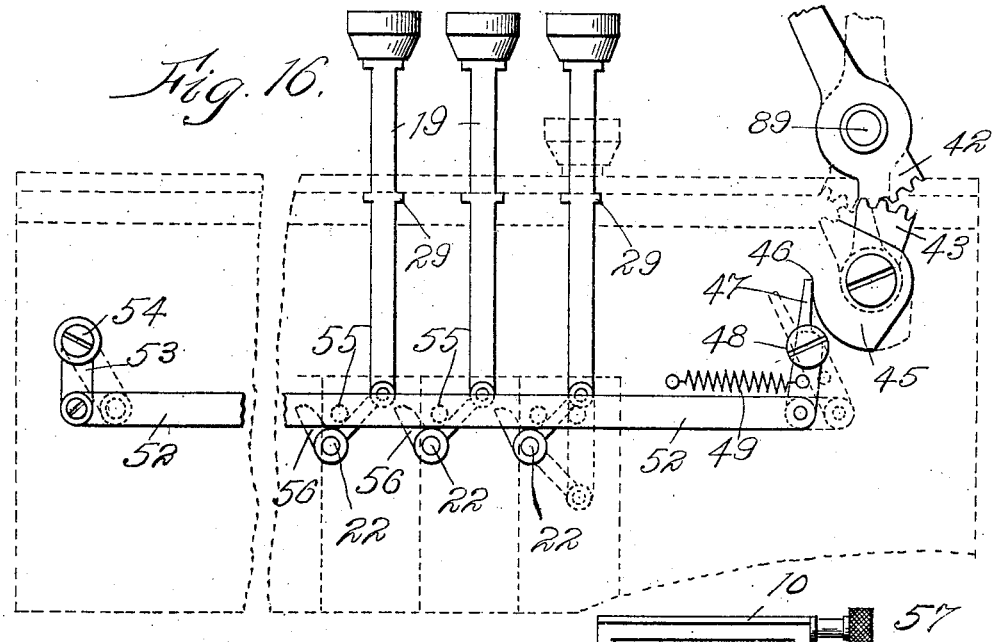
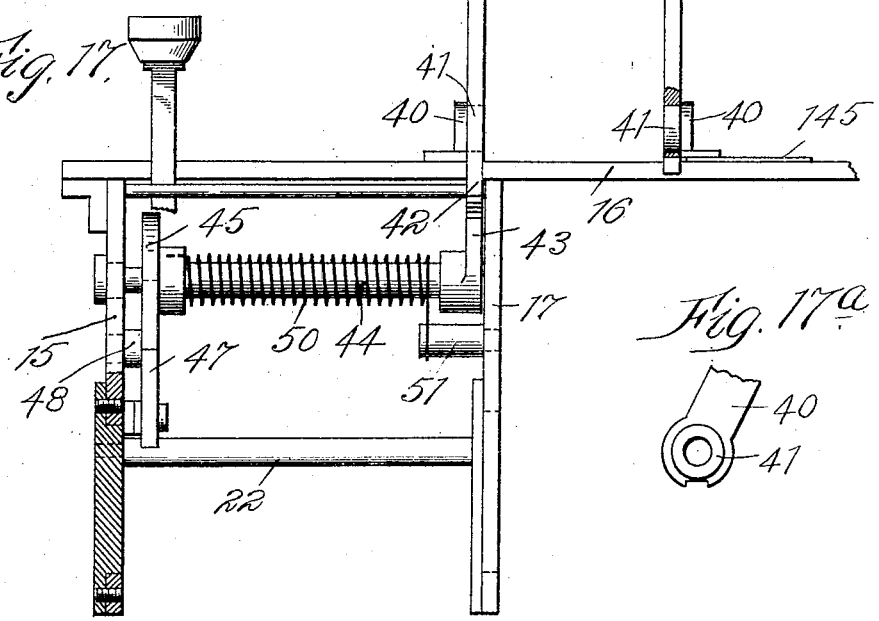
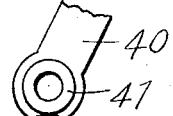

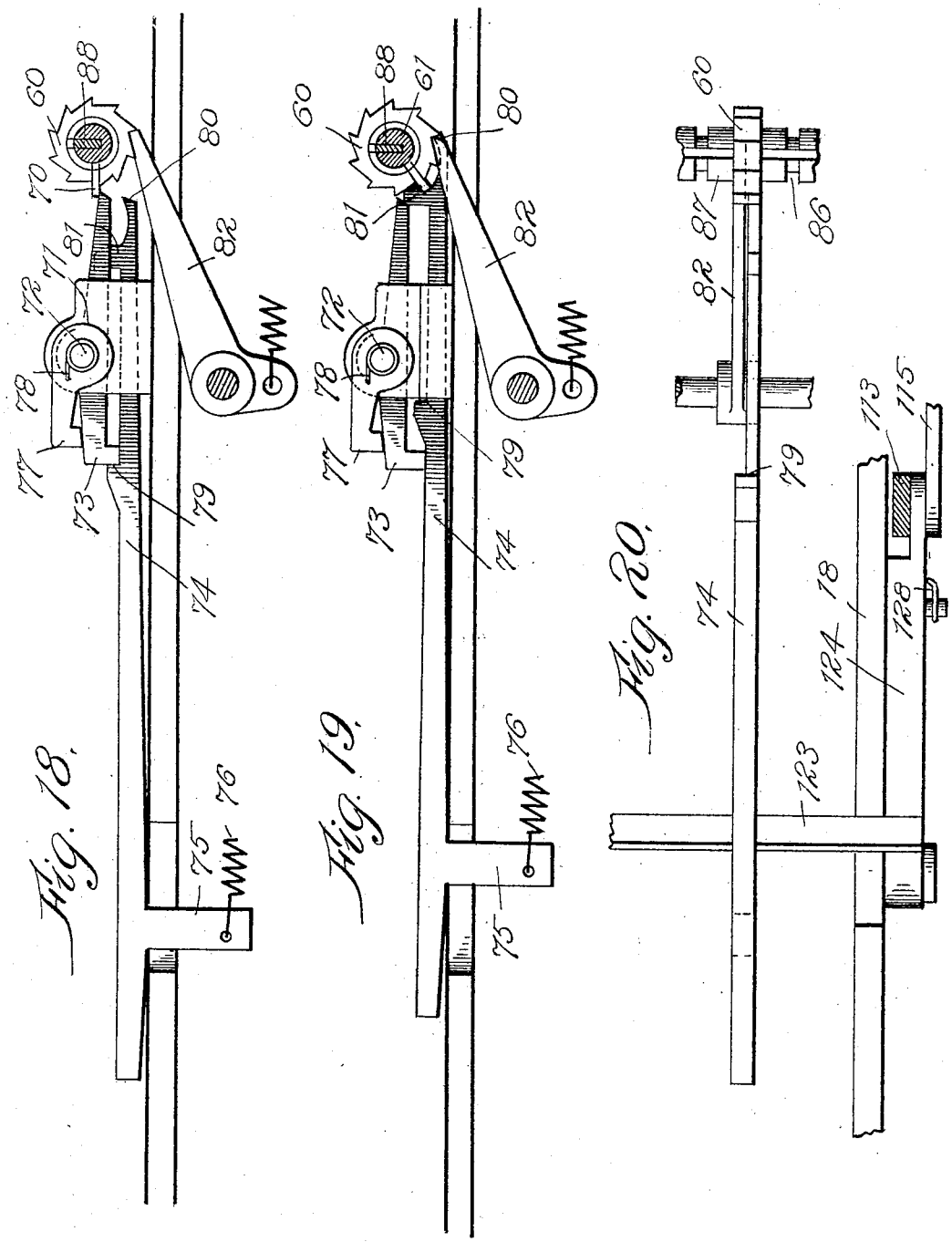

L. S. CRANDALL.
ADDING AND LISTING MACHINE.
APPLICATION FILED NOV. 11, 1908.
926,319.
Patented June 29, 1909.
13 SHEETS—SHEET 11.
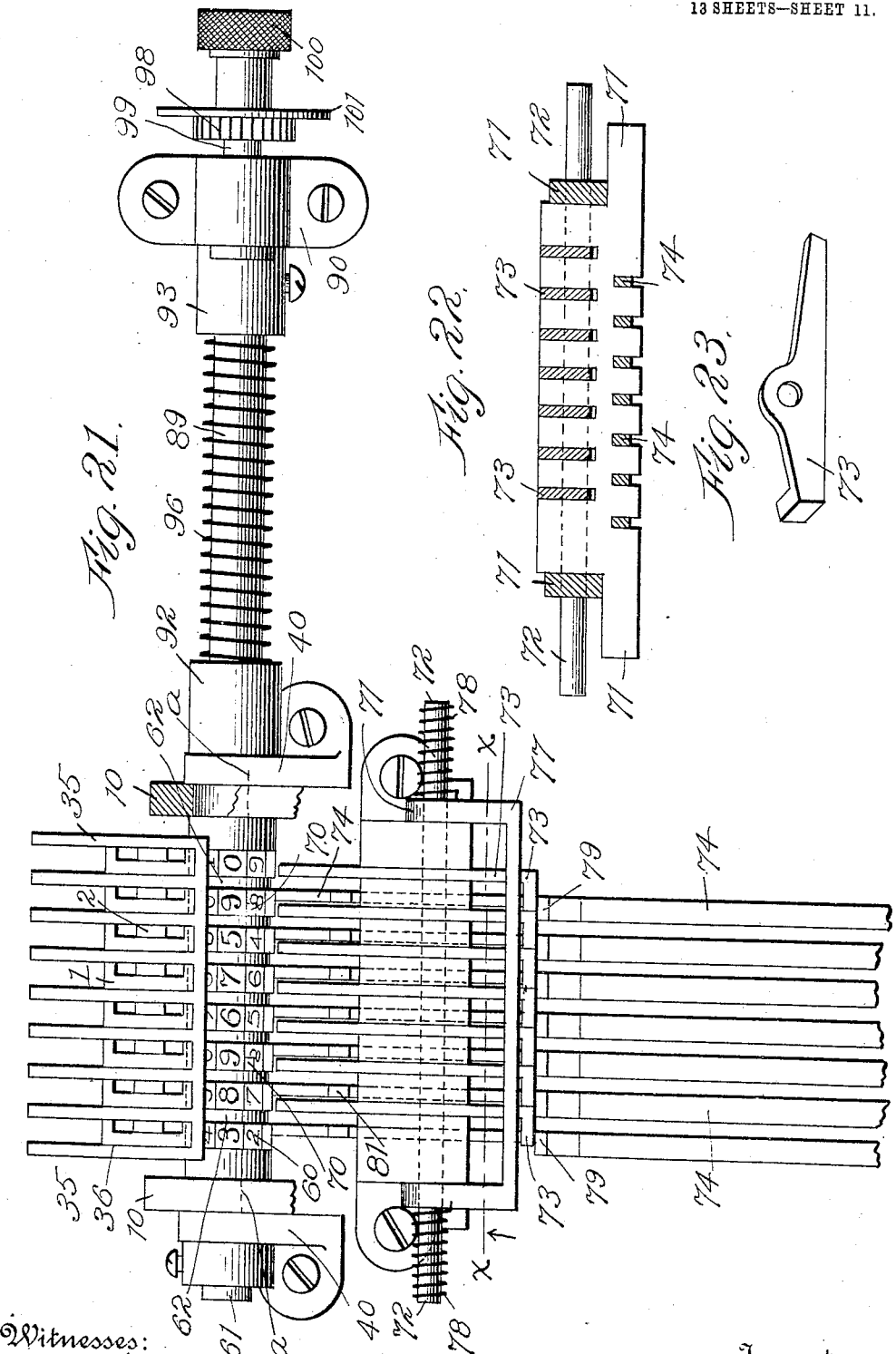

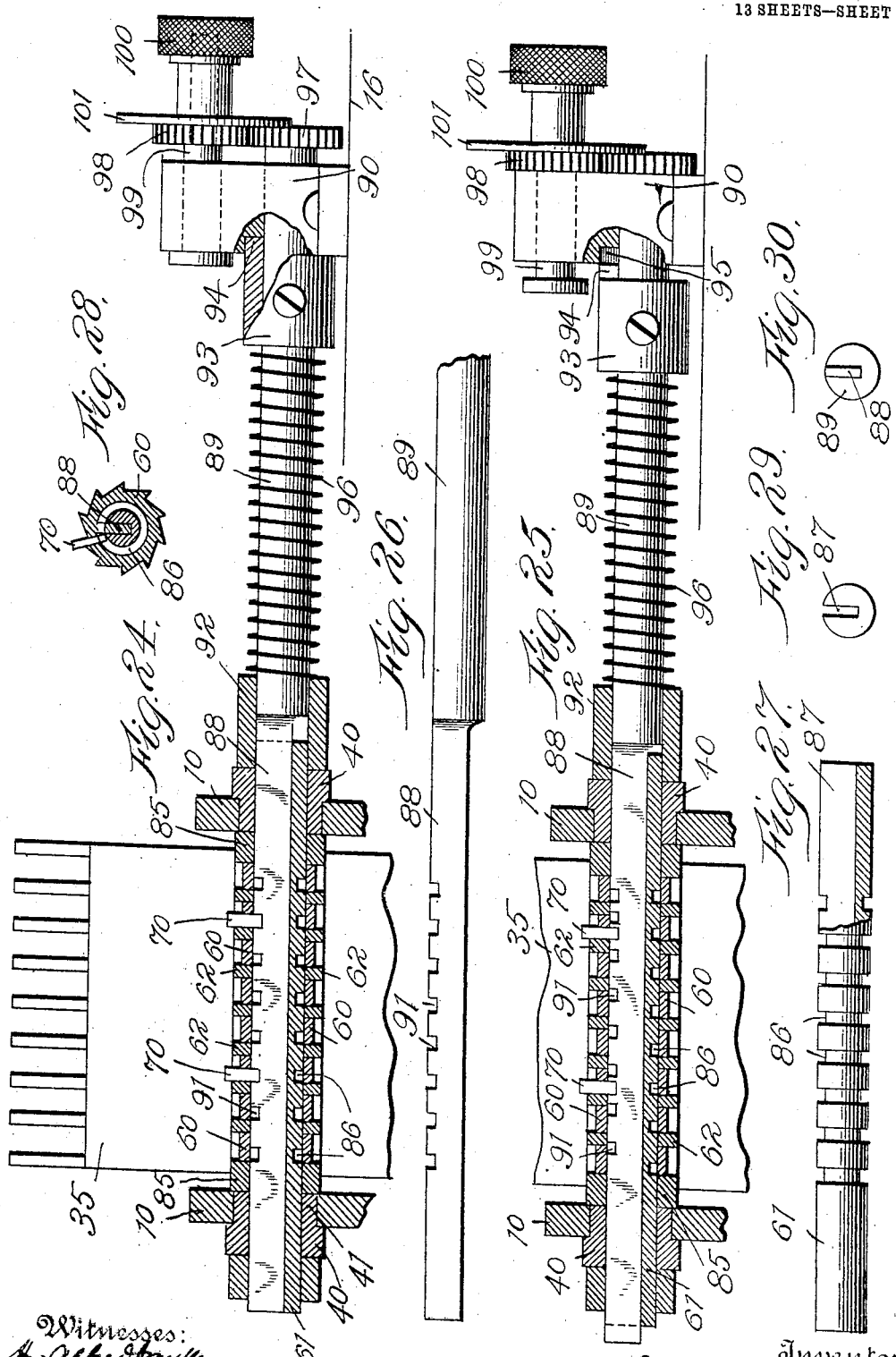

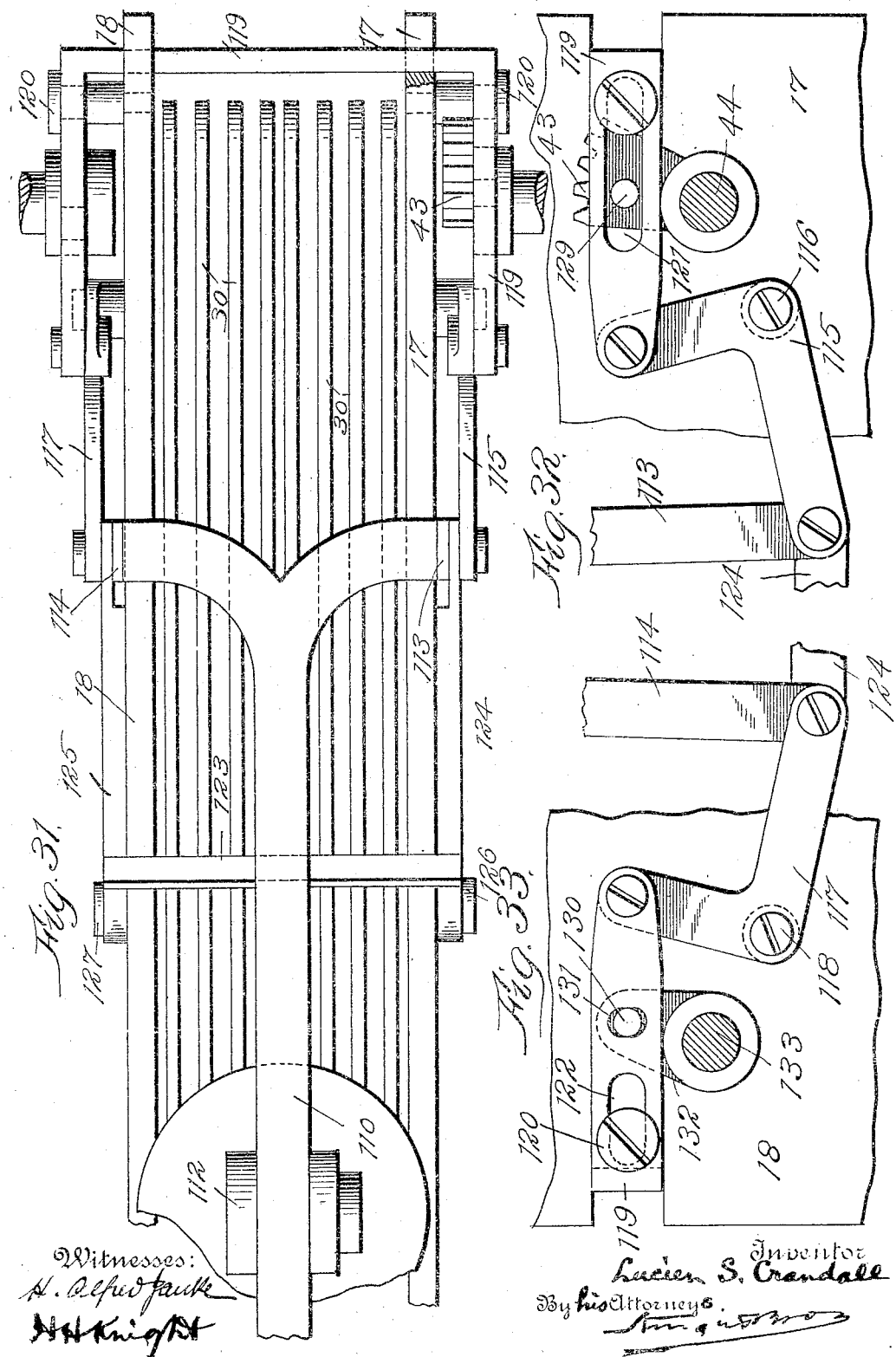

UNITED STATES PATENT OFFICE.

LUCIEN S. CRANDALL, OF WASHINGTON, NEW JERSEY, ASSIGNOR TO BENJAMIN F. TRACY, OF NEW YORK, N. Y.

ADDING AND LISTING MACHINE.

No. 926,319.  Specification of Letters Patent.  Patented June 29, 1909.

Application filed November 11, 1908. Serial No. 462,107.

*To all whom it may concern:*

Be it known that I, LUCIEN S. CRANDALL, a citizen of the United States, and resident of Washington, in the county of Warren and State of New Jersey, have invented certain new and useful Improvements in Adding and Listing Machines, of which the following is a clear and full specification, the novel features being more clearly pointed out in the accompanying claims and illustrated in the accompanying drawings.

My invention relates in general to machines of the type in which the items are added and are printed in a column at the same time.

In particular my invention relates to an adding machine in which a compound type bar is employed, the particular features of which are described and claimed in a copending application.

I have illustrated my novel adding machine in the accompanying drawings in which—

Figure 1 is a plan view of the whole machine. Fig. 2 is a right end elevation of Fig. 1, in which the end plate of the machine has been removed. Fig. 3 is a side elevation showing the lower part of the side wall broken away, in order to more clearly illustrate the position of the keys and their operating cams. Fig. 4 is a detail side view in enlarged scale of my novel type bar. Fig. 5 is the same view showing the type bar in shifted position ready to present the type selected to the platen. Fig. 6 is a front view of the bar showing the printing type faces. Fig. 7 is a rear view thereof showing the reading type faces. Fig. 8 is a portion of one of the two members of the bar. Fig. 9 is a perspective view of portions of the two bar members, showing the manner in which they interlock with each other. Fig. 10 is a transverse section of a portion of the lower part of the machine showing the shafts controlled by the keys for operating the cams which lift the type bar operating levers. Fig. 11 is a plan view of a portion of the mechanism shown in Fig. 10. Fig. 12 is a detail view of one of the journal plates. Fig. 13 is a detail view of a part of the machine in side elevation showing the control of the cams by the key bars for lifting the type bar levers. Fig. 14 is a detail side elevation of a part of the machine showing the means for controlling the type bars and for resetting the type bars into normal position. Fig. 15 is a side elevation of a part of the machine showing a portion of the printing elements and of elements coöperating therewith. Fig. 16 is a side elevation of a part of the machine showing the operation of the printing hammer. Fig. 17 is an end elevation thereof partially in section. Fig. 17ª is a left hand view of the right hand pivot joint 40, 41 in Fig. 17. Figs. 18 and 19 are side elevations showing the carry-bar before and after operation. Fig. 20 is a plan view thereof. Fig. 21 is a plan view of the adding wheels and a part of their operating mechanism. Fig. 22 is a sectional elevation on line $x-x$ in Fig. 21 seen in the direction of the arrow. Fig. 23 is a detail perspective view of one of the carry dogs for releasing the carry-bars. Figs. 24 and 25 are vertical sections of the zero-return mechanism for the adding wheels in normal and in operative position. Figs. 26 to 30 inclusive are detail parts of this mechanism. Fig. 31 is a plan view of the type-bar-reset mechanism. Fig. 32 is a right hand elevation of a part thereof, and Fig. 33 is a left hand elevation of a part thereof.

I will describe the various functions of the mechanism in the following sequence: (1) the type bar, (2) the position movement, (3) the impression movement, (4) additional function of the type bar, (5) the adding wheels, (6) the zero-return mechanism for the adding wheels, (7) the reset lever, (8) the platen movement, (9) the type bar restraining bail, and (10) the listing cut off.

The type bar is illustrated in detail in Figs. 4 to 9 inclusive. The particular feature of my novel type bar, on which a plurality of types are provided so that by either shifting the bar or the platen each type may be selectively brought in front of the platen into operative position, is that the intermediate spaces between two types, which heretofore in machines using that kind of type constituted wasted space, are utilized by placing a type of the adjoining bar member into these spaces. By forming the type bar of two members, each member carrying types fitted into the interstices of the other member and by movably joining these two members together, the effect is obtained that when, by suitable means, the types of one member are withdrawn within the interstitial type spaces of the other member, the other member is ready to present any of its types selected to the platen without the adjoining types of the other member interfering with the printing operation.

In Fig. 4, 1 is a member of such a compound bar, as I shall call it hereafter, which is pivoted at 3 to the lever mechanism of the machine to be described later on, so that it may be shifted by this mechanism upward in the direction longitudinally of the bar. 2 is the coöperating member of the bar pivoted at 4 to member 1. Member 1 bears a plurality of types 5 with a suitable space between them to allow the types 6 of member 2 to evenly fit into these spaces. The thickness of each member is, as may be seen from Fig. 6, approximately one half the width of its types and the types of each member are overlapping the other member, so that thus an interlocking compound bar is formed as may be clearly seen from Figs. 8 and 9 in which the details and relative positions of the members are illustrated. By proportioning the two members relatively to each other in this manner, it will be seen from Fig. 6, that a vertical row of types is thus produced with only space enough between the two adjoining types to allow relative motion of the two members, and that the shifting of the bar in longitudinal direction in order to present any of the types selected to the printing point of platen 11, is very small compared with the large number of types provided on the bar. In order to avoid the moving of both members, if a type of one them is brought into printing position, and thus to avoid the interference of the types adjoining the one in operation, I provide the following means: The edges of the bar members 1 and 2, facing in the direction of their types 5 and 6, are formed as ratchet bars a certain portion of their length, the teeth of each of the members being positioned relatively to the teeth of the other member, so that the tooth of one member will register with the recess formed by the two teeth of the other member, as shown at 7 and 8 in Fig. 4. If now the compound bar should be shifted upward longitudinally, as will be described in detail later on, so that for instance the tooth 7 should be opposite to pawl 9, the detail structure of which will be described later on, and so that one of the left hand side extensions of member 2 should be opposite to hammer 10, which will be also referred to in detail later on, it will be seen that bar member 1 will be retained by pawl 9 relatively to its member 2, as indicated in Fig. 5, when hammer 10 moves in the direction of the arrow toward the printing point 11. By this means, one of the types 6 of member 2 which has been selected by raising the bar to the height indicated in Figs. 4 and 5, will be brought to the printing point and types 5 of member 1 will recede in the interstitial spaces of types 6.

It may be pointed out, as a preliminary explanation, that pawl 9, only the operative end of which is shown in Figs. 4 and 5, is fixed relatively to the shifting direction of the bar and has motion only transverse thereto. Hammer 10, the operative end of which is shown in Figs. 4 and 5, is also fixed relatively to the longitudinal motion of the bar and has movement only transverse thereto. Interstitial spaces are also provided on the left hand side of each member of the bar, corresponding with the interstitial spaces on the right hand side, on which the types are provided. In these spaces of each member are disposed portions of the other member corresponding in their shape with the corresponding type at the other side of this member. I have indicated these portions in Figs. 4-9 with numerals 13 and 14. From the position of member 2, shown in Fig. 5, it will be seen that the types 6 carried by this member have now sufficient space between each other, so that the types 5 on either side of the types 6 at the time in printing position, will not interfere with the printing of this type. In order to facilitate the writing for the operator, that is to enable him to see which type is at the time in printing position, the projections 13 and 14 of members 1 and 2, above referred to, against which hammer 10 operates, and which correspond with the types in number and position and which are faced by the operator, are provided with reading or item-proof types of corresponding designation. These reading types are shown in Fig. 7 at 13 and 14. Since hammer 10 operates against these portions of the two bar members, I prefer to have the reading types intaglio, while the printing types on the right hand side of the two bar members are preferably cameo, as commonly used in typewriting or similar machines. Fig. 6, illustrating portions of the two members 1 and 2 drawn apart, clearly shows how the type of member 2, representing numeral 1, fits into the interstitial space formed by the types representing numerals 0 and 2 carried by member 1, and Fig. 9 also clearly illustrates the form of the two members and the form of the types to permit the shifting of the two members relatively to each other as illustrated in Fig. 5. This compound bar is disposed in the adding machine of the kind above referred to which I will now describe in detail as follows with reference to the several functions of the machine.

*Position movement.*—The machine as illustrated in Figs. 1, 2 and 3 comprises a rectangular casing 15 with a top plate 16 on which the outside mechanism of the machine is mounted. The casing is longitudinally divided into three main compartments by walls 17 and 18. The compartment between these two inner walls hereinafter called inner compartments is smaller than the two compartments formed outside of these walls, which latter are of equal width and are hereinafter called outer compartments. In the top plate are guided the key bars 19 in slots of suitable size. For this purpose plate 16 is divided into a number of transverse sections 20, each of which is provided at one edge with slots 21 of suitable size to receive the key bar 19, sections 20 corresponding in number with the number of transverse rows contained in the key board. Starting from the bottom row of the key board in Fig. 1, each following section 20 closes the slots of the previous section, so that the bars 19 are guided on all four sides.

The key board, as shown in Fig. 1, is arranged so that, counting from the right to the left, the vertical columns of keys represent the different denominations of the numbers to be added and printed, in this particular case the denominations from the units to the tens of millions, or considering the last two right-hand columns as cent denominations, the machine will indicate up to the hundred thousands of dollars. Each column read from the top to the bottom contains keys denoting numerals from 0-9 which may be written in the denominations represented by that column. Therefore each transverse row of keys indicates the same numeral in different denominations. Between the two outer longitudinal walls of each outer compartment are disposed key-bar shafts 22 each of which is journaled in these walls, as indicated in Figs. 10 to 12, by means of journal plates 23 provided with recesses 24 in which the neck of the shaft is disposed. In order to conveniently assemble these shafts, suitable holes are provided in side plates 15 of the casing in which one end of the shafts is journaled; while the other end of shafts 22 is journaled with its neck in journal plate 23, of which as many are fastened to walls 17 and 18 as there are transverse rows on the key board. Each following journal plate 23 closes the recesses 24 of the previous plate, forming the journal of one shaft. Journal plates 23 may be fastened to plates 17 and 18 respectively by screws 26. The number of shafts corresponds with the number of keys on the key board and their arrangement in the machine is such that four shafts are disposed in one journal plate 23 one above another, which corresponds with one half of the number of keys in one transverse row. These four shafts are located in one outer compartment. The other four shafts in a vertical row, belonging to the other half of the number of keys in that row, are correspondingly located in the other outer compartment. Ten vertical rows of shafts are disposed in each outer compartment between the walls 15 and 17 and 15 and 18 respectively corresponding with the number of transverse rows on the key board. Each vertical row of shafts is provided, between walls 15 and 17 and 15 and 18 respectively, with an arm 27 to the free end of each of which a key bar 20 is pivoted, so that if the key of this bar is operated this shaft will be rocked by this arm 27. For each arm 27 a tension spring 28 is provided, fastened at one end to this arm and at the other end to a fixed point near the top plate 16 at a suitable place inside of the casing as indicated in Fig. 13, so that by these springs each of the keys will be held in their lifted normal position, as for instance indicated in Figs. 3, 13, 14 and 16.

A stop 29 provided on each key bar 19 abuts against the under side of top plate 16 to limit the upward movement of the key bar. From Fig. 10 it will be noted that the shafts 22 of each vertical group are of different lengths, so that their inner ends protrude a different distance into the inner compartment. The lowest shafts protrude the farthest and the uppermost protrude the least distance. Within the inner compartment is disposed a group of key bar levers 30 which extend substantially throughout the whole length of this compartment and which are suitably pivoted at the left hand end (Fig. 3) at 31, so that they form a group of levers staggered in V-shape, as may be seen from Fig. 10. At the inner ends of shafts 22 protruding into the space containing levers 30 are fastened cams 32, and the levers 30 are arranged so that each lever will rest upon all the cams of a longitudinal row of shafts protruding an equal distance into the compartment, as is for instance indicated in Fig. 3, in which the lowest of the levers 30 is shown resting upon all the cams 32, shown in this figure in one longitudinal row. Furthermore the cams 32 which belong to one longitudinal row, in other words to one column of keys such as is for instance indicated in Fig. 3, increase in their height the nearer they are located to the pivot point 31 of levers 30, as may be seen from this figure. However the cams of one vertical row of shafts, that is, shafts operated by one transverse row of keys, are of equal height. If now, one of the keys of this column in Fig. 3 is operated it will be seen that the lever resting upon the cams will be lifted by the cam, the key of which has been operated. This is for instance indicated in dotted lines in Fig. 14 in which only the upper end of the cam 32 is shown in the dotted lines. It will be also noted with regard to the previous explanations that the key of one column nearest to the pivot point of levers 30 will lift this lever the highest, while the key farthest from these pivot points will lift the levers the least. Furthermore the cams in each vertical row will lift their coöperating lever the same height.

Each of the cams 32 is double the width of the lever which it operates, as may be seen from Fig. 10, and each cam is provided with a nose 33, which is only one half the width of the cam, so that when this cam lifts its lever, the nose will glide alongside the lever, as is for instance shown in Figs. 11 and 14. For each nose a pin 34 is provided on lever 30, which, when the cam with its nose is turned up to lift the lever will be engaged by the nose so that the lever will be prevented from rising beyond the desired point by its own momentum, in case the key has been struck too hard. To the free end of each lever 30, all levers being of equal length, is now pivoted, by means of pivot pin 3, the compound type bar 36 comprising the two members 1 and 2 of the character described above. This manner of pivoting is shown clearly in detail in Fig. 14. Each compound bar 36 is vertically guided in a slot provided in guide block 35, which is mounted vertically at the end of the machine and fastened between walls 17 and 18 so that all the compound bars 36 will protrude with their type bearing end above top plate 16 and form a transverse row of bars in these slots which are open toward platen 11, as indicated in Figs. 1 and 2. If now one of the keys is operated the type bar connected with the key in the manner above described will be raised by the lever the higher, the nearer the key is located to the pivot point of the lever 30 to which bar 36 is pivoted. The cams 32 operating each lever are in practice dimensioned so that each key of one column will lift the type bar 36, belonging to this column, to a differently suitable height, so that for each key in this column a certain type of this bar is brought in line with the printing point of platen 11. In the guide slots of block 35 are further disposed a corresponding number of pawls 9 on a common pivot 39 as indicated in Fig. 14, so that each type bar 36 will have a corresponding pawl 9. The position of these pawls relatively to these bars is so that each pawl bears against both members of the compound bar opposite to which it is located, as may be seen from Fig. 2. Each pawl 9 is held in engagement with its bar by means of a spring 38 fastened at the other end to a rod 37 disposed between walls 17 and 18, Figs. 2 and 14, and bears, when the type bar is in the lowest, normal position, with all the keys at rest, against the straight edge above teeth 7 and 8 of bar members 1 and 2. If now the bar is lifted by one of its keys to present the type desired to the printing point of platen 11, pawl 9 will act upon the two members of the bar as described above, where the structure of the compound bar was explained, so that the member of the bar which contains the desired type will be free to be moved toward the platen, while the other member of the bar will be retained by pawl 9. Bar 36 is now in the proper position to make the desired type impression on the platen. The mechanism for causing the bar to strike the platen is as follows:

*Impression movement*, (Figs. 1, 2, 3, 15, 16 and 17.)—The hammer 10 for causing the desired member of the compound bar to strike the platen has the form of a bail which is pivoted to two lugs 40 provided on top plate 16 near either side of guide block 35, (Fig. 17). Each lug 40 has a boss 41 which serves as a pivot for hammer 10. The left hand shank of the hammer extends downward and forms a toothed sector 42 which is in mesh with a toothed sector 43 fastened to a rocking shaft 44 mounted between side plate 15 and inner wall 17 of the casing, Figs. 15–17. To the other end of shaft 44, near side wall 15, is fastened a disk 45 provided with a notch 46 in which engages a dog 47 pivoted to side wall 15 at 48. Dog 47 is held in engagement with the surface of disk 45 by spring 49 fastened at one end to dog 47 and at the other end to the casing at a suitable place. On shaft 44 is provided a strong torsion spring 50, Fig. 17, one end of which bears against pin 51 fastened to wall 17 and the other end of which is fastened to the hub of disk 45, the torsion of this spring being in such a direction that disk 45, and toothed sector 43, Fig. 15, will be turned to the left and thus hammer 10 to the right, so that the latter will strike the compound bar or bars in its path, and cause it or them to strike the platen. Such a position of the bar is for instance shown in Fig. 14 in dotted lines and in Fig. 5 in full lines.

When hammer 10 is withdrawn into its normal position shown in Figs. 15 and 16, disk 45 turns to the right, so that dog 47 bearing by spring pressure upon the surface of disk 45, will be forced to engage in notch 46 and thus retain disk 45 and hammer 10 in its normal position with torsion spring 50 under tension. To the free end of dog 47, protruding beyond its pivot point 48, is pivoted a link 52 which is pivoted at the other end to a swinging arm 53 pivoted at 54 near the pivot points 31 of key bar levers 30 to the left hand side wall 15 of the casing, as may be seen from Figs. 3, 16 and 17. This link 52 with its swinging arm 53 and dog 47 forms a parallel link system. For each of shafts 22 operated by the farthest right hand column of keys in Fig. 1, of which three are indicated in Fig. 16, a pin 55 is provided on link 52 in a suitable position to be engaged by noses 56 which are provided on each of these shafts near the wall of the outer compartment as illustrated in Fig. 16 in side view and in Fig. 17 in front view. Thus it will be seen that if any of the keys in this column is operated and its corresponding shaft 22 rocked, nose 56 connected to this shaft will throw link 52 to the right, by abutting against pin 55, into the position shown in dotted lines in Fig. 16 with reference to the first key from the right, which will in turn cause dog 47 to release cam 45 and thus enable spring 50 to throw hammer 10 against the type bar as described above. From the above it will be also noted, that the release of the printing hammer 10 being caused only by pressing one of the keys in this first right hand column of the key board, which I hereinafter will call the unit keys, the numbers in all the other denominations which might occur in an item must be positioned first so that when the unit key is operated, all other characters of the item to be written are in place. Therefore the operator should always start in writing with the highest denomination. The resetting of the printing hammer into its normal position, shown in Fig. 15, will be described later on with reference to the reset-lever. A knob 57 may be provided at one side of the hammer 10, as shown in Fig. 17, for retaining hammer 10 in its normal position in case the operator should desire to strike one of the unit keys without operating the hammer.

*Additional functions of the type bar.*—When by operating any of the keys of the key board any of the several type bars 36 in one transverse row is operated in the manner described above, and a certain type of the bar corresponding with the desired numeral has been brought in front of the platen, it is necessary that for each bar the corresponding adding wheel should be advanced to the proper tooth or step corresponding with the figure represented by the type in printing position, in order to show to the operator the addition of their figure to the sum of the figures or items previously printed. The general principle of the structure of such adding or total wheels being known in the art, I shall hereinafter refer only to the particular novel features which are embodied in these wheels used in my machine. These wheels are illustrated in Figs. 14 and 21. The adding wheels 60, corresponding in number with the number of type bars 36, are disposed in line with these bars in the rear wall of guide block 35 facing the operator and are disposed loosely on a common shaft 61, in a manner which will be described later. For the present it is sufficient to state that these adding wheels protrude through the rear wall of guide block 35, which for this purpose is cut out in the manner indicated in Fig. 14, and that each wheel is separated from the adjoining wheel by a partition 62 forming part of block 35. The edge of member 2 of each compound bar 36 facing the adding wheels is provided with teeth 63 corresponding in number with the teeth 64 of the adding wheel 60 and of proper size and shape to coöperate therewith, so that if type bar 36 is lifted by its lever 30 to the height desired, the adding wheel 60 in engagement with this bar will be revolved a corresponding number of teeth. In the present machine, the types are so arranged on the two members of the compound bar that the uppermost type denotes the character zero, while the lowest type denotes character 9. If now for instance the character zero in any of the denominations is to be brought in line with the platen, bar 36 is lifted the first step and brought into the position indicated in dotted lines in Fig. 14. In this instance the adding wheel connected with this bar should not revolve, because no item should be added to the total amount indicated by the wheels, by pressing the zero key in any of the denominations. For this purpose the teeth on member 2 of each bar 36 commence a sufficient distance below the adding wheel, so that if the bar is lifted to print the character 0, the teeth 63 will still remain out of engagement with the adding wheel and assume the position indicated in dotted lines in Fig. 41 without moving the adding wheel.

*The adding wheels.*—As described above, the adding wheels 60 are provided with a number of teeth corresponding with the number of types contained on the coöperating compound bar, in this instance ten teeth corresponding with the characters 0–9. Each adding wheel is of sufficient width to receive the corresponding character as an index on the face of its teeth so that the operator by glancing on a certain transverse line over the whole row of teeth of the adding wheels may at any time read the sum of all the items previously added and printed, the tooth of each wheel on that line representing with its index a certain denomination. If now for instance the unit wheel of the adding wheels (the farthest wheel to the right Fig. 21) is about to complete one revolution, so that the tooth bearing the character zero appears again on the operator's reading line, it is necessary to move the adding wheel of the next higher denomination, that is the tens, one tooth in order to show on the reading line $a$—$a$ that ten units of the next lower order have been carried over and added to the units of the next higher order. In this particular instance the tens-wheel should be advanced one tooth to bring its figure 9 into the reading line. The same operation should take place on the remaining adding wheels in case one of the next lower wheels is about to complete one revolution. For this purpose I have provided the following means: Each adding wheel, except the one of the highest denomination on the left hand side (Fig. 21) is provided with an abutment pin 70 which extends across one half of the width of one tooth and is in a position relatively to the profile of this tooth as indicated in Figs. 14 and 18.

In front of the adding wheels toward the operator is mounted a bracket 71 in which is disposed a shaft 72 which serves as a common pivot to a group of carry dogs 73. These dogs correspond in number and are in line with the adding wheels bearing pins 70 above referred to, the end of each carry dog facing its adding wheel being disposed so that pin 70 of their wheel will engage this end once in each revolution in the manner indicated in Fig. 18. The other end of each carry dog 73 points downward and retains in its normal position a spring operated carry bar 74 of which one is provided for each carry dog. These bars 74 comprise a longitudinal member disposed substantially in parallel with top plate 16 and resting thereon, and a downward extending member or detent 75, extending through a slot in top plate 16 to which detent the tension spring 76 is fastened, tending to throw its bar 74 toward its corresponding adding wheel 60.

A bail 77 is pivoted on shaft 72 and yieldingly pressed against the group of dogs 73 by means of torsion springs 78 fastened at one end to shaft 72 and at the other end to bail 77 on opposite sides. In normal position as indicated in Fig. 13 each bar 74 is withdrawn and held in this position by its dog 73 engaging nose 79 of the bar. Each bar is disposed relatively to its dog and the adding wheels, so that the dog of the adding wheel of one denomination retains the carry bar of the next higher denomination, and each carry bar is disposed so, that when it is released by its dog and thrown by its spring toward the adding wheel, it will engage a tooth of its adding wheel in its path with its nose 80 and by the tension of spring 76 revolve its adding wheel one tooth. In order to prevent further rotation of the adding wheel a stop 81 of suitable shape is provided near nose 80 which will bear against the adding wheel as indicated in Fig. 19, so that further rotation of the adding wheel through this bar is prevented. A spring pressed retaining dog 82 is provided for each adding wheel in order to prevent its movement in the opposite direction at any time. The width of each carry bar 74 near its nose 80 is half of that of the adding wheel and its location relatively to the adding wheel which it operates is so that it will clear the pin 70 of this wheel as indicated for instance in Fig. 21. Owing to tension spring 76 being fastened near the end of arm 75 of carry bar 74, this bar will be always tilted upward with its nose 80, so that nose 79 will clearly engage its dog 73.

Each bar 74 is longitudinally guided in a slot provided in the lower part of bracket 70 as clearly shown in Fig. 22. By releasing the bar in the manner above described, it will perform a tilting motion when assuming the position indicated in Fig. 19. In order to provide sufficient space for this tilting of bar 74 it is slightly rearwardly beveled from its bearing point on plate 16 as may be seen from Fig. 18. The operation of the mechanism just described is as follows: Assuming that the adding wheel shown at 60 in Fig. 18 represents the unit wheel which is located at the right hand end in Fig. 21, and that adding wheel 60 in Fig. 19 represents the tens wheel. If now the unit wheel in Fig. 18 should be about to complete one revolution and show figure 0 on the reading line $a$—$a$ so that its pin 70 will strike dog 73 in line therewith, this dog which retains the carry bar for the tens wheel will release its bar which in turn will be thrown by its spring 76 toward the tens wheel and move the latter one tooth farther. The same operation will take place relatively to wheels indicating the remaining higher denominations in case the wheel of the next lower denomination should be about to complete one revolution. In this manner the proper amount will be carried over from the lower denomination to the next higher denomination. It is obvious that the adding wheel of the highest denomination does not require a carry dog or pin 70.

*Zero return mechanism.*—If a certain number of items have been added it may be desired to return the adding wheels into the zero position to list and add a new series of items. For this purpose I have provided the following mechanism: As has been previously stated, adding wheels 60 are disposed on a common shaft 61 which is journaled in bracket 40 within boss 41 serving as a pivot for hammer 10 as explained above. This arrangement is clearly illustrated in Fig. 24. As may be seen from this figure the different adding wheels are held separated from each other by spacing walls 62 which are part of guide block 35, the end wheels being held at the proper distance from each bracket 40 by spacing rings 85. Shaft 61 which is illustrated in Figs. 27 and 29 in detail is provided with a number of annular grooves 86 corresponding in number with the number of adding wheels. As may be seen from Fig. 24, grooves 86 are one half the width of the adding wheels 60. Each pin 70 of one of the adding wheels previously mentioned with reference to the carry over mechanism engages in one of the grooves so that it will run in this groove when the adding wheel is revolved (Figs. 24 and 28). Shaft 61 is further longitudinally slotted in the manner indicated at 87 in Fig. 29. In the slot 87 is slidingly fitted a knife 88 which forms part of the shaft 89 in line with shaft 61 and journaled at its free end in bracket 90 mounted on the top plate of the machine. Knife 88 is provided with notches 91 corresponding in number and relative distance with the number and location of annular grooves 86 in shaft 61, so that if knife 88 is inserted in slot 87 of shaft 61 a proper depth, as indicated in Fig. 24, notches 91 will register with the corresponding annular grooves 86 of shaft 61, and consequently pins 70 of adding wheels 60 are still free to revolve unobstructed in their annular grooves.

Between bracket 90 and bracket 40 is loosely mounted on shaft 89 a collar 92 abutting against bracket 40, and at the other end near bracket 90 is fixed to shaft 89 a collar 93 provided with a boss 94 adapted to engage in a recess 95 of bracket 90, as indicated in Figs. 24 and 25. Between collars 92 and 93 is disposed an expansion spring 95 tending to press the collar 93 against bracket 90, so that if at any time boss 94 should register with recess 95 of bracket 90, the boss will be pressed by its spring into the recess 95 and shaft 89 being shifted then the farthest to the right will be prevented from revolving. This is the normal position of shaft 89 indicated in Fig. 24 in which as above described pins 70 of adding wheels 60 are free to revolve in their grooves 86 with which recesses 91 of knife 88 are then in line. A vertical section on the line $y-y$ through one of the adding wheels in Fig. 24 is illustrated in Fig. 28. In this figure knife 88 may be clearly seen within shaft 61 and pin 70 within groove 86. A left hand end view of knife 88 with shaft 89 illustrated in Fig. 26 in side view is shown in Fig. 30.

To the end of shaft 89 protruding beyond bracket 90 is fastened gear wheel 97 which is in mesh with gear wheel 98 mounted on a hand shaft 99 slidingly journaled in bracket 90. Shaft 99 is provided at the right hand end with knurled head 100 for operating this shaft by hand. Close to gear wheel 98 is fastened to shaft 99 a disk 101 of sufficiently large diameter to partially overlap gear wheel 97 on shaft 89. As will be seen from Fig. 24, gear wheels 97 and 98 are, when shaft 89 is in its normal position with boss 94, engaged in recess 95 at a distance from bracket 90 which is substantially equal to the depth of recess 95. If now at any time hand shaft 99 should be pushed to the left, shaft 89 will be taken along by means of disk 101 and collar 93 will be disengaged from recess 95 as shown in Fig. 25, and shaft 89 can now be revolved by turning knurled head 100. By pushing shaft 89 to the left it will be seen that notches 91 of knife 88 will get out of alinement with grooves 86 of shaft 61, so that the upper edge of knife 88 will be in the path of pins 70 of all the adding wheels, as is indicated with reference to two adding wheels and their pins 70 shown in Fig. 25. If now knurled head 100 is turned, shafts 89 and 61 will revolve thereby picking up all the pins 70 in the path of knife 88, and after one revolution of shaft 89 all pins 70 will be engaged by knife 88 in their grooves and be in line with each other. Pins 70 being in all the wheels fastened to the teeth bearing the same figure, all the adding wheels may be then set back to the zero point. The relative position of the zero point of the adding wheels and boss 94 of collar 93 and its co-operating recess 95 are chosen so that at the moment boss 94 is thrust back into its recess 95 by spring 96 after one revolution of shaft 89, the tooth of each adding wheel bearing index 0 is on the operator's reading line $a-a$. By thrusting boss 94 into its recess 95 the shaft is again locked and notches 91 are returned into line with grooves 86 of shaft 61 so that all the adding wheels 60 are again free to be revolved by their individual compound bars as the latter are operated

*Reset lever.*—After the keys have been operated to indicate and print the desired item, the machine must be reset into its normal position, that is to say: all the type bars lifted to the proper height to print the desired character must be returned into their normal position above referred to, hammer 10 must be withdrawn and reset for the next stroke and all carry-bars which have been released during the carry-over operation must be withdrawn from their adding wheels. In order to complete all these operations in as simple a manner as possible for the operator, I have provided reset lever 110 which is rocked by depressing reset key 111 arranged longitudinally in the middle at the lower end of the key board of the machine as indicated in Fig. 1. This lever is shown in side elevation in its full length in Fig. 3 and portions thereof are shown in larger scale in side elevation in Figs. 13, 14 and 15, and in plan view in Fig. 31.

As illustrated in Figs. 1 and 3, lever 110 is pivoted on top plate 16 of the machine in a bracket 112. The end of lever 110 near the printing mechanism is forked as indicated in Figs. 1 and 31. Each prong of the fork extends laterally beyond the inner walls 17 and 18. To each fork is pivoted a link 113 and 114 respectively, link 113 extending downward into the right hand outer compartment and link 114 into the left hand outer compartment (seen in Fig. 1). Link 113 is shown in side elevation in Figs. 13 and 15 which illustrate the printing mechanism contained in the right hand outer compartment. To link 113 is attached with a loose fit bell crank 115 pivoted at 116 to wall 17. A bell crank 117 correspondingly pivoted to wall 18 at 118, in the left hand outer compartment, is connected in a similar manner to link 114 of reset lever 110. The two other corresponding arms of bell cranks 115 and 117 respectively are connected to bail 119 which extends across the whole row of type bars at the right hand end of the machine and surround guide block 35, Figs. 14, 15 and 31.

The bail 119 is guided at both ends by means of guide pins 120 fastened to walls 17 and 18 respectively (Figs. 31, 32 and 33) each of these pins being disposed in a slot 121 and 122 of bail 119 respectively. Thus it will be seen that if reset lever 110 is rocked, bail 119 will have a sliding motion to and from the type bars. Walls 17 and 18 are suitably recessed for this purpose as may be seen from Figs. 32 and 33. To links 113 and 114 is further loosely connected a bail 123 by means of its arms 124 and 125 respectively. Bail 123 is pivoted at 126 and 127 to the outside of walls 17 and 18 respectively as may be seen from Fig. 31, and extend upward and across the inner compartment close to top plate 16. The purpose of this bail will be described later on, it may be however preliminarily stated that a tension spring 128 is fastened at one end to a suitable point of bail 123 and at the other end to a suitable point of plate 17 as shown in Fig. 13, in order to hold reset lever 110 and the lever mechanism connected therewith just described in the normal position shown in Figs. 13, 14 32 and 33. As may be seen from Figs. 32 and 33, bail 119 above referred to is when in normal position shown in these figures, shifted the farthest to the left (respectively to the right Fig. 33). It may be also seen from Figs. 14 and 15 that the portion of bail 119 extending across type bars 36 is located between these bars and their corresponding dogs 9, so that if the key of reset lever 110 is depressed the bail 119 through the intermediate bell cranks 115 and 117 will be thrown to the right (Fig. 14 in dotted lines) and withdraw all dogs 9 14 from their bars 36 so that any of these type bars, which should have been previously raised by depressing one of its keys and been held by its dog 9 in the proper elevated position as described, will drop back with its lever 30 into its normal position indicated in full lines in Fig. 14.

As illustrated in Figs. 15 and 32 toothed sector 43 is provided with a pin 129 which extends with sufficient play into slot 121 of bail 119. The location of this pin on toothed sector 43 is chosen so that when sector is in its normal position shown in Fig. 32, and in dotted lines in Fig. 15, pin 129 will be a sufficient distance away from the left hand end of slot 121, so that if the hammer is set off to strike one of the type bars in the manner described above which will cause sector 43 to move to the left, pin 129 can move to the left in slot 121, and will be then near the left hand end of this slot. If now all the bars, raised by operating their keys are released in the manner just described, by moving bail 119 to the right (Fig. 32), pin 129 then abutting against the left hand end of slot 121 will be taken along by the bail and with toothed sector 43 be turned back to the right, which will in turn also revolve disk 45, so that dog 47 will again engage in notch 46 of disk 45 and lock it in its normal position. By moving toothed sector 43 to the right hammer 10 will be withdrawn from the bars and return to the left into its normal position shown in Fig. 15 and be reset thereby for a new stroke.
As has been previously stated the two links 113 and 114 respectively are loosely connected to bail 123 which is shown in side elevation in Fig. 13 and part of it in plan view in Fig. 20.

From Fig. 13 it will be noted that the member of bail 123 which extends from wall 17 to wall 18, as shown in Fig. 31 is in its normal position shown in Fig. 13 in the line of movement of all of the detents 75 of carry bars 74. Therefore bail 123 on its movement to the left, upon operating reset lever 110, will move the detent 75 of any carry bar 74 which may have been thrown to the right during the carry over operation of the adding wheels, back to the left into the normal position shown in Fig. 13. It will be remembered from the description of the carry over operation that carry bars 74 move from the left to the right when they are released by carry dogs 73 shown in Figs. 18 and 19. This operation of bail 123 will withdraw all carry bars in engagement with their adding wheels and reset these bars for a new cycle of operation, by causing their dogs 73 to fall behind noses 79 of the bars.

*Platen movement.*—On the side of bail 119 illustrated in Fig. 33, is provided a vertical slot 131 in which engages a pin 130 fastened to a crank arm 132 of shaft 133. This shaft is located in the right hand outer compartment (Fig. 2) in line with shaft 44 of the hammer operating mechanism, located in the left hand compartment. Shaft 133 is journaled in wall 18 at one end and in the outer wall 15 of the main casing at the other end. By depressing the reset key and thus throwing bail 119 to the left (Fig. 33) shaft 133 is rocked thereby so that feeding pawl 135 pivoted on crank arm 134 mounted on shaft 133 will be operated to move ratchet wheel 137 of platen 11 one step further in the manner well known in the art. A torsion spring 140, fastened at one end to pin 142 journaled in crank arm 134 and abutting against pin 141 fixed to arm 134, will cause pawl 135 to remain in engagement with ratchet wheel 137. A retaining spring dog 136 is provided for ratchet wheel 137. This mechanism is shown in side elevation in Fig. 15 in dotted lines, being in this figure located on the far side of the machine, and in Fig. 2 in front elevation. On platen shaft 138 journaled in brackets 67 are mounted the two ribbon spools 139 which may be alternately locked to this shaft in any suitable manner, well known in the art, so as to cause the ribbon to run off one spool and coil up on the other spool and vice versa. Since various manners may be employed for suitably guiding the ribbon longitudinally of the platen between the type bars and the platen, I have omitted this mechanism as well known. Two paper transport rolls 143 and 143¹ are mounted in brackets 67 underneath platen 11, one near either end, as shown in Figs. 2 and 15, between which rolls and the platen the paper is led before it is led past the types.

*Type bar restraining bail.*—When the type bars which have been raised during the writing operation are released by reset lever 110 as described above, and fall back into their normal position, their toothed edge facing the adding wheels will glide past these wheels and the type bars will have a tendency to tumble toward the platen which may cause the ribbon to touch the platen and produce a blur on the paper. To overcome this disadvantage I have provided a type bar restraining bail. Between the two brackets 67 (Figs. 2 and 14) is mounted a shaft 66 on which bail 65 of suitable length to extend across the row of type bars is provided. On either side of bail 65 a torsion spring 68 is mounted on shaft 66, with one end fastened to bracket 67, with the other end to bail 65. Both tension springs hold bail 65 with sufficient pressure against the partitions of block 35, separating the type bars so as to prevent the bars from tumbling by their own weight beyond said partitions against the platen. However the force of the hammer impact during the printing operation is sufficient to overcome the spring pressure of bail 65 and to throw the bars against the platen.

*Listing cut off.*—Sometimes the operator may desire to use only the adding mechanism of the machine without printing or listing the several items on the paper strip, therefore, means must be provided for locking the printing mechanism. These means comprise the following mechanism: As is illustrated in Figs. 1 and 17, a slide 145 is mounted on top plate 16 to slide transversely thereof guided by screws 148 disposed in slots 146 of the slide. This slide can be pushed by means of knob 147 toward hammer 10 near its pivot point, so as to engage in a recess 149 which is in line with the slide when the hammer is withdrawn into its normal position indicated in Fig. 15. Thus hammer 10 and its mechanism is locked and cannot be operated even if one of the keys in the unit column releases dog 47 as described above, and only the adding mechanism will be operated by the bars raised by operating the keys in the various columns. The operator is then able to only read the item just added on the reading types on the back of the compound bars 36 facing the operator and is also able to read the total sum of the items on the indices on the toothed faces of the adding wheels on reading line a—a, Fig. 21.

The operation of the whole machine is shortly as follows: Normally the hammer is withdrawn from the types and under tension of spring 50 and all the type bars are in their lowest position. If the operator now desires to write and print for instance the figure 357241 he starts by first pressing key 3 in the sixth column from the right (the above figure having six denominations), then key 5 in the fifth column, then key 7 in the fourth column, key 2 in the third column, key 4 in the second column and key 1 in the first (Fig. 1). By depressing these keys, the key bar levers 30 of these six columns will be raised a suitable height by the cams 32 operated by these keys, so as to lift the compound bars connected to these levers the proper height to present in an uninterrupted line the figures 3, 5, 7, 2, 4, 1 to the printing line of the platen. In depressing the unit key by which the hammer is set off in the manner described before, the type bar operated by the unit column is first raised to its proper height before the hammer is set off, some lost motion being allowed during which the bar can be raised to its proper height before dog 47 releases the hammer. At the moment all the bars necessary for this figure have been raised, the operator will see, on the back of the bars facing him, the item proof types corresponding in their character with the types of these bars facing the platen in printing position. These item proof characters will appear to him in one line above the upper rear edge of guide block 35 marked 1 in Fig. 14. In the instance above referred to figure 357241 will appear on this line. By raising the several bars to their desired height for printing the above figure, the adding wheels of these bars have been revolved a suitable distance so as to add this item to the sum of items previously printed and by glancing over reading line a—a for the indices on the teeth of the adding wheels, the operator will be able to read in the transverse line the total sum of items including the one which appears to him on the back of the raised bars above the line 1 just referred to. After the hammer has been set off by the key in the unit column and the type bars have been thrown against the platen, the operator locks the reset lever by depressing key 111 by which the various portions of the mechanism are reset into their normal position in the manner above referred to, that is to say, hammer 10 will be withdrawn from the type bars and reset for a new stroke, pawls 9, holding the raised bars in printing position in front of the platen, will be withdrawn from these keys by bail 119 and the bars will drop back into their normal position. At the same time the carry bars 74, which may have been released to operate their adding wheels one tooth, to carry the proper amount from one denomination into the next higher denomination, will be withdrawn from their adding wheels by bail 123, picking up their detents 75 in its path to the left and shifting them back into their normal position in which these bars are engaged and held by carry dogs 73. At the same time the platen movement comes into operation in the manner just described, and the paper strip on the platen is fed one line. Upon releasing reset lever 110, bail 119 is withdrawn into its normal position and all the dogs 9 return into engagement with their bars, bail 123 is withdrawn from detents 75 and feeding pawl 135 of the platen slides back on ratchet wheel 137 one tooth. The machine is now returned into its normal condition for the next printing and adding operation.

While I have shown and described a particular manner in which the type bars are moved into printing position, and locked therein and a particular manner in which the carry-over mechanism may be constructed so that it may be controlled by the adding wheels, but operated independently thereof and also particular structures for carrying out the idea of returning all the adding wheels to zero from inside of their supporting shaft, and for resetting all of the various elements by one common key for a new cycle of operation to avoid any work requiring appreciable power to be done by the fingers during the writing and printing operation, I do not wish to limit myself to these particular structures, representing merely an embodiment of my ideas as an example.

I have hereinbefore fully described and illustrated in the drawings the zero return mechanism as an example of how the adding wheels may be re-set by operating one element, but it is obvious that this whole mechanism may be omitted and the adding wheels returned to zero by operating such keys on the keyboard that will cause each adding wheel to show the numeral o on the reading line. Zero return mechanisms, similar to that shown and described here, are known in the art, and I do not claim the particular features thereof as new.

What I claim is:

1. In a machine of the character described in combination with a platen and compound type bars each comprising a plurality of members, each member bearing a plurality of types, means for operating said bars to selectively position their types into the printing line of said platen.

2. In a machine of the character described, in combination with a plurality of compound type bars, each comprising a plurality of members, each member bearing a plurality of types disposed in a row longitudinally thereof, means for longitudinally shifting said bars to selectively position their types into the printing line of said platen.

3. In a machine of the character described in combination with operating keys, a platen and type bars, each bar comprising a plurality of members having a plurality of types disposed in a row longitudinally thereof, means for each bar to be selectively operated by a plurality of said keys corresponding in number with the number of types on said bar for longitudinally shifting said bar to selectively position said types into the printing line of said platen.

4. In a machine of the character described in combination with a platen and compound type bars, each bar comprising a plurality of members having a plurality of types disposed in a row longitudinally thereof, a key bar lever for each type bar pivotally supported at one end, and pivotally supporting said type bar at the other end, a column of keys for each lever operatively connected therewith and corresponding in number with the number of types on said type bar, said keys adapted to cause the type bar to selectively position the types into the printing line of the platen.

5. In a machine of the character described in combination with a platen and type bars, each bar having a plurality of types disposed in a row longitudinally thereof, a key bar lever for each type bar pivotally supported at one end, and pivotally supporting said type bar at the other end, a column of keys for each lever corresponding in number with the number of types on each bar, a camshaft and a cam for each key operatively connected therewith, and adapted to lift said lever, said cams disposed at different distances from the pivot point of their lever, each cam when operated by its key lifting said lever and said bar a different height to position the corresponding type into the printing line of the platen.

6. In a machine of the character described in combination with a platen and type bars, each bar having a plurality of types disposed in a row longitudinally thereof, a key bar lever for each type bar pivotally supported at one end, and pivotally supporting said type bar at the other end, a column of keys for each lever corresponding in number with the number of types on each bar, a camshaft and a cam for each key operatively connected therewith, and adapted to lift said lever, said cams disposed at different distances from the pivot point of their lever, each cam when operated by its key lifting said lever and said bar a different height to position the corresponding type into the printing line of the platen, and a nose on each cam and a pin for each nose on said lever, said nose engaging said pin when the cam is operated, for preventing the rising of the lever beyond the distance determined by said cam.

7. In a machine of the character described in combination with a platen and type bars, each bar having a plurality of types disposed in a row longitudinally thereof, a key bar lever for each type bar pivotally supported at one end, and pivotally supporting said type bar at the other end, a column of keys for each lever operatively connected therewith and corresponding in number with the number of types on said type bar, said keys adapted to cause the type bar to selectively position the types into the printing line of the platen, means for returning said keys into their normal position and means for retaining said type bar with the selected type in the printing line.

8. In a machine of the character described in combination with a platen and type bars, each bar having a plurality of types disposed in a row longitudinally thereof, a key bar lever for each type bar pivotally supported at one end, and pivotally supporting said type bar at the other end, a column of keys for each lever corresponding in number with the number of types on each bar, a camshaft and a cam for each key operatively connected therewith, and adapted to lift said lever, said cams disposed at different distances from the pivot point of their lever, each cam when operated by its key lifting said lever and said bar a different height to position the corresponding type into the printing line of the platen, means for immediately returning each cam and each key into its normal position and means for retaining said type bar with the selected type in the printing line.

9. In a machine of the character described in combination with a platen and type bars, each bar having a plurality of types disposed in a row longitudinally thereof, a key bar lever for each type bar pivotally supported at one end, and pivotally supporting said type bar at the other end, a column of keys for each lever corresponding in number with the number of types on each bar, a camshaft and a cam for each key operatively connected therewith, and adapted to lift said lever, said cams disposed at different distances from the pivot point of their lever, each cam when operated by its key lifting said lever and said bar a different height to position the corresponding type into the printing line of the platen, and a nose on each cam and a pin for each nose on said lever, said nose engaging said pin when the cam is operated, for preventing the rising of the lever beyond the distance determined by said cam, means for immediately returning each cam and each key into its normal position and means for retaining said type bar with the selected type in the printing line.

10. In a machine of the character described in combination with a platen and type bars arranged in a row transversely of the machine, having a plurality of types, a key bar lever for each type bar disposed longitudinally of the machine and pivotally supported at one end and pivotally supporting its type bar at the other end and keys for operating said levers, said levers staggered in V-shape in the machine.

11. In an adding machine having compound type bars comprising a plurality of members, each bearing a plurality of interlocking types of the character described, in combination with said bars and a platen, means for operating each of said bars to selectively position its types into the printing line of said platen, and means for locking said bar in selected position and for restraining the undesired member of said bar.

12. In an adding machine having compound type bars comprising a plurality of members, each member bearing a plurality of interlocking types of the character described, in combination with said bars and a platen, means for longitudinally shifting each bar to selectively position said types into the printing line of the platen, and means for locking said bar in selected position and for restraining the undesired member of said bar.

13. In an adding machine having type bars comprising a plurality of members, each bearing a plurality of interlocking types of the character described, in combination with said bar and a platen and operating keys, means for each bar, selectively operated by a plurality of keys corresponding in number with the number of types on said bar, for longitudinally shifting said bar to selectively position said types into the printing line of said platen and means for locking said bar in selected position and for restraining the undesired member of said bar.

14. In an adding machine having compound type bars comprising a plurality of members, each member bearing a plurality of interlocking types of the character described, in combination with said bar and a platen and operating keys, a key bar lever for each compound bar, pivotally supported at one end and pivotally supporting said bar at the other end, a column of keys for each lever operatively connected therewith and corresponding in number with the number of types in said compound bar, said keys adapted to cause said type bar to selectively position said types into the printing line of the platen and means for locking said bar in selected position and for restraining the undesired member of said bar.

15. In an adding machine having compound type bars comprising a plurality of members, each member bearing a plurality of interlocking types of the character described, in combination with said bar and a platen and operating keys, a key bar lever for each compound bar, pivotally supported at one end and pivotally supporting said bar at the other end, a column of keys for each lever corresponding in number with the number of types on each bar, a cam shaft and a cam for each key operatively connected therewith, adapted to lift said lever, said cams disposed at different distances from the pivot point of their lever, each cam when operated by its key lifting said lever and said bar a different height to position the corresponding type into the printing line of the platen and means for locking said bar in selected position and for restraining the undesired member of said bar.

16. In an adding machine having compound type bars comprising a plurality of members, each member bearing a plurality of interlocking types of the character described, in combination with said bar and a platen and operating keys, a key bar lever for each compound bar, pivotally supported at one end and pivotally supporting said bar at the other end, a column of keys for each lever corresponding in number with the number of types in each bar, a camshaft and cam for each key operatively connected therewith, adapted to lift said lever, said cams disposed at different distances from the pivot point of their lever, each cam when operated by its key lifting said lever and said bar a different height to position the corresponding type into the printing line of the platen and means for locking said bar in selected position and for restraining the undesired member of said bar, and a nose on each cam and a pin on said lever for each nose, said nose engaging said pin when said cam is operated for preventing the rising of said lever beyond the distance determined by said cam.

17. In an adding machine having compound type bars comprising a plurality of members, each member bearing a plurality of interlocking types of the character described, in combination with said bar and a platen and operating keys, a key bar lever for each compound bar, pivotally supported at one end and pivotally supporting said bar at the other end, a column of keys for each lever corresponding in number with the number of types in each bar, a camshaft and cam for each key operatively connected therewith, adapted to lift said lever, said cams disposed at different distances from the pivot point of their lever, each cam when operated by its key lifting said lever and said bar a different height to position the corresponding type into the printing line of the platen and means for immediately returning each cam and key into its normal position, and means for lifting said bar into selected position and means for locking said bar in said position and for restraining the undesired member of said bar.

18. In an adding machine having compound type bars comprising a plurality of members, each member bearing a plurality of interlocking types of the character described, in combination with said bar and a platen and operating keys, a key bar lever for each compound bar, pivotally supported at one end and pivotally supporting said bar at the other end, a column of keys for each lever corresponding in number with the number of types in each bar, a camshaft and cam for each key operatively connected therewith, adapted to lift said lever, said cams disposed at different distances from the pivot point of their lever, each cam when operated by its key lifting said lever and said bar a different height to position the corresponding type into the printing line of the platen and means for immediately returning each cam and each key into its normal position and a spring pressed retaining pawl for each compound bar for locking said bar in selected position and for restraining the undesired member of said bar substantially as described.

19. In an adding machine having compound type bars comprising a plurality of members, each member bearing a plurality of interlocking types of the character described, in combination with said bar and a platen and operating keys, a key bar lever for each compound bar, pivotally supported at one end and pivotally supporting said bar at the other end, a column of keys for each lever corresponding in number with the number of types in each bar, a camshaft and cam for each key operatively connected therewith, adapted to lift said lever, said cams disposed at different distances from the pivot point of their lever, each cam when operated by its key lifting said lever and said bar a different height to position the corresponding type into the printing line of the platen and means for immediately returning each cam and each key into its normal position and a spring pressed retaining pawl for each compound bar for locking said bar in selected position and for restraining the undesired member of said bar substantially as described, and means for releasing any of said bars retained by its pawl.

20. In a machine of the character described the combination with a platen, compound type bars having a plurality of interlocking type bearing members and arranged in a row in parallel to the platen and adapted to present any of their types to the printing line of the platen; of means for throwing any of such bars, thus presenting their types against the platen.

21. In a machine of the character described the combination with a platen, type bars having a plurality of interlocking type bearing members and arranged in a row in parallel to the platen and adapted to present any of their types to the printing line of the platen; of spring operated means for throwing any of such bars thus presenting their types against the platen.

22. In a machine of the character described, the combination with a platen, type bars having a plurality of types and arranged in a row in parallel to the platen and adapted to present any of their types in the printing line of the platen, a plurality of keys for presenting the types of each bar selectively of spring operated and normally retained means for throwing any of such bars presenting their types against the platen, said means adapted to be released by operating any of the keys of a predetermined bar.

23. In a machine of the character described the combination with a platen, type bars having a plurality of types and arranged in a row in parallel to the platen and adapted to present any of their types to the printing line of the platen; of a bail suitably pivoted and extending across the path of all of said type bars for throwing any of such bars, thus presenting their types against the platen.

24. In a machine of the character described, the combination with a platen, type bars having a plurality of types and arranged in a row in parallel to the platen and adapted to present any of their types in the printing line of the platen, and a plurality of keys for presenting the types of each bar selectively; of a normally retained spring operated bail suitably pivoted and extending across the path of all of said bars for throwing any of such bars, thus presenting the types against the platen, said bail adapted to be released by operating any of the keys of a predetermined bar.

25. In a machine of the character described, the combination with a platen, type bars having a plurality of types and arranged in a row in parallel to the platen and adapted to present any of their types in the printing line of the platen, a plurality of keys for presenting the types of each bar selectively; of a bail extending across the path of all of these bars suitably pivoted and having a toothed sector, a rocking shaft having at one end a toothed sector in mesh with said bail sector, and at the other end a notched disk and being spring operated in a direction to throw said bail toward said platen, a spring pressed dog tending to engage in the notch of said disk to retain said bail from the platen and a bar operatively connected to said dog and to all the keys of a predetermined type bar, any of said keys adapted to disengage said dog from said disk and permit said bail to throw any of the bars, presenting their types toward the platen.

26. In a machine of the character described in combination with a spring operated printing bail, a notched disk operatively connected therewith and a spring pressed dog adapted to engage in the notch of the disk to retain said bail in inoperative position, a platen and a row of type bars adapted to present their types to said platen, a plurality of keys for each type bar and a rocking shaft for each key for moving its type bar into desired position in front of the platen, and a swinging bar pivoted to said dog and disposed adjacent to the key rocking shafts of one predetermined type bar, said swinging bar having pins corresponding in number with the number of keys for said type bar, said rocking shafts having noses adapted to engage said pin, the operation of each nose causing said dog to release said notched disk, said bail when released adapted to throw any of the type bars which are in printing position against said platen.

27. In a machine of the character described in combination with a plurality of compound type bars having a plurality of type bearing members, a platen and means for operating each bar to present said type selectively in printing position to said platen and an adding wheel for each bar adapted to add the item printed by its bar to the items previously printed, each adding wheel being selectively operated by one member of its bar and in articulation therewith when moved into printing position.

28. In a machine of the character described in combination with a plurality of compound type bars having a plurality of type bearing members, a platen and means for operating each bar to present its type selectively to said platen and an adding wheel for each bar having ratchet teeth corresponding in number with the number of types on its bar, one member of each bar having ratchet teeth adapted to coöperate with the teeth of said adding wheel and corresponding in number therewith to advance the adding wheel according to the item presented by said bar to said platen.

29. In a machine of the character described, compound type bars having a plurality of type bearing members and adding wheels, one for each type bar, each wheel having ratchet teeth corresponding in number with the number of types on its bar, ratchet teeth on one member of said bar corresponding in number with the number of types on said bar and adapted to coöperate with the teeth of said wheel, said wheel teeth having the item represented by the types of said bar impressed upon their faces.

30. In an adding machine having adding wheels representing a plurality of denominations mounted on one shaft and movable independently of each other and means for individually advancing each wheel the number of its units required and carry-over means for each wheel disposed and operated independently thereof, and adapted to cause its wheel to advance one of its units, and means on each wheel for causing the carry-over means of the next higher denomination to operate when said wheel representing the lower denomination has advanced ten of its units.

31. In an adding machine having adding wheels representing a plurality of denominations mounted on one shaft and movable independently of each other and means for individually advancing each wheel the number of its units required and carry-over means for each wheel disposed and operated individually thereof, and adapted to cause its wheel to advance one of its units and adapted to arrest its wheel after such advance, and means on each wheel for causing said carry-over means of the next higher denomination to operate when said wheel representing the lower denomination has advanced ten of its units.

32. In an adding machine having adding wheels representing a plurality of denominations mounted on one shaft and movable independently of each other and means for individually advancing each wheel the number of its units required, a spring controlled carry-over bar for each wheel disposed and operated independently of said wheels, tending to move longitudinally toward its wheel and to advance it one of its units, a retaining dog for each bar normally retaining it in inoperative position, a pin on each wheel fastened to corresponding units relatively to each wheel and coöperating with the retaining dog of the next higher denomination, adapted to lift said dog upon advancing the tenth of its units to cause the release of the carry-over bar of its higher denomination to advance its wheel one of its units, and means independently of the wheels for returning any bar released into its inoperative position.

33. In an adding machine having adding wheels representing a plurality of denominations mounted on one shaft and movable independently of each other and means for individually advancing each wheel the number of its units required, a spring controlled carry-over bar for each wheel disposed and operated individually of said wheels, tending to move longitudinally toward its wheel and to advance it one of its units, a retaining dog for each bar normally retaining it in inoperative position, a pin on each wheel fastened to corresponding units relatively to each wheel and coöperating with the retaining dog of the next higher denomination, adapted to lift said dog upon advancing the tenth of its units to cause the release of the carry-over bar of its higher denomination to advance its wheel one of its units, and a stop on each carry bar for locking its wheel in advanced position, and means independently of said adding wheels for returning any bar released into inoperative position.

34. In an adding machine the combination with a platen having a feed, a plurality of type bars adapted to be shifted into printing position and means for locking said bars in said position, printing means adapted to throw the type bars shifted into said position against the platen, and adding wheels having a carry-over mechanism adapted to be controlled thereby but disposed and operated independently thereof; of common means for operating said platen feed and for releasing said bars from the printing position and for resetting said printing and said carry-over means.

35. In an adding machine the combination with a platen having a feed, a plurality of type bars adapted to be shifted into printing position and means for locking said bars in said position, printing means adapted to throw the type bars shifted into said position against the platen, and adding wheels having a carry-over mechanism adapted to be controlled thereby but disposed and operated independently thereof; of a common reset lever adapted to operate said platen feed and to release said bars from the printing position and to reset said printing and carry-over means.

36. In an adding machine the combination with a platen having a feed, a plurality of type bars adapted to be shifted into printing position and individual pawls for locking the type bars shifted into said position and a printing hammer suitably operated to throw the type bars shifted into said position against the platen, and adding wheels having individual carry-over bars adapted to be released by said wheel but disposed and operated independently thereof; of a common reset lever adapted to operate said platen feed and to release the pawls of said type bars and to withdraw said hammer from said type bars into inoperative position and to reset the carry-over bars released by said wheels.

37. In an adding machine the combination with a platen having a feed, a plurality of type bars adapted to be shifted into printing position and individual pawls for locking the type bars shifted into said position, a spring operated printing hammer suitably pivoted to throw the type bars shifted into said position against the platen and adding wheels having individual spring operated carry-over bars adapted to be released by said wheels, but disposed independently thereof; of a rocking lever normally held in inoperative position having a finger key at one end and a suitable bell-crank lever mechanism at the other end, a bail slidingly disposed and connected to said lever, mechanism adapted to lift said pawls from said type bars and to withdraw said hammer from said types into inoperative position and to operate said platen feed, another bail pivotally disposed and connected to said rocking lever, adapted to withdraw the carry-over bars released by said adding wheels and reset same into inoperative position.

38. In an adding machine the combination with a platen and a plurality of type bars disposed in a row in parallel to said platen, means for longitudinally shifting said bars into printing position and printing means for throwing the shifted bars against the platen;

of means for restraining said bars from said platen while said printing means are inoperative.

39. In an adding machine the combination with a platen and a plurality of type bars disposed in a row in parallel to said platen means for longitudinally shifting said bars into printing position and printing means for throwing the shifted bars against the platen; of yielding means for restraining said bars from said platen while said printing means are in inoperative position.

40. In an adding machine the combination with a platen, a plurality of type bars disposed in a row in parallel to said platen, partitions between said bars for laterally guiding same, means for longitudinally shifting said bars between the partitions into printing position and means for throwing the shifted bars against the platen; of means yieldingly bearing against said partitions for restraining said bars from said platen while said printing means are inoperative.

41. In an adding machine the combination with a platen, a plurality of type bars disposed in a row in parallel to said platen, partitions between said bars for laterally guiding same, means for longitudinally shifting said bars between the partitions into printing position and means for throwing the shifted bars against the platen; of a spring pressed bail suitably pivoted and extending across the whole row of said bars and abutting against said partitions for restraining said bars from said platen while said printing means are inoperative.

42. In an adding machine the combination with a platen, a plurality of type bars disposed in a row in parallel to said platen and adapted to be shifted into the printing line of said platen, adding wheels suitably operated by said bars during the shifting operation and a printing hammer suitably operated when the last of the bars to be shifted has been placed in position, for throwing the shifted type bars against said platen; of means for arresting said printing hammer to operate said adding wheels without causing said bars to print.

43. In an adding machine the combination with a platen, a plurality of type bars disposed in a row in parallel to said platen and adapted to be shifted into the printing line of said platen and a spring operated printing hammer pivotally supported to throw the type bars shifted into said line against the platen and adapted to automatically operate after the last of said bars to be shifted has been placed in position, said hammer having a notch near its pivot point, and adding wheels suitably operated by said bars during the shifting operation; of a hand operated latch slidingly disposed and adapted to engage in said hammer notch for arresting said hammer in inoperative position to operate said adding wheels without causing said bars to print.

LUCIEN S. CRANDALL.

Witnesses:
H. ALFRED JAUKE,
H. H. KNIGHT.